United States Patent
Hirose

(10) Patent No.: US 12,509,153 B2
(45) Date of Patent: Dec. 30, 2025

(54) COLUMNAR MEMBER

(71) Applicant: NIPPON STEEL CORPORATION, Tokyo (JP)

(72) Inventor: Satoshi Hirose, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 385 days.

(21) Appl. No.: 17/924,623

(22) PCT Filed: May 13, 2021

(86) PCT No.: PCT/JP2021/018286
§ 371 (c)(1),
(2) Date: Nov. 10, 2022

(87) PCT Pub. No.: WO2021/230331
PCT Pub. Date: Nov. 18, 2021

(65) Prior Publication Data
US 2023/0182819 A1 Jun. 15, 2023

(30) Foreign Application Priority Data
May 14, 2020 (JP) .................................. 2020-085434

(51) Int. Cl.
*B62D 21/15* (2006.01)
(52) U.S. Cl.
CPC .................................. *B62D 21/152* (2013.01)
(58) Field of Classification Search
CPC ....... B62D 21/152; B62D 25/08; B62D 25/04
(Continued)

(56) References Cited

U.S. PATENT DOCUMENTS 8,783,721 B2 * 7/2014 Hirose .................... B62D 21/15
52/843
9,415,810 B2 * 8/2016 Faruque ................. B62D 25/06
(Continued)

FOREIGN PATENT DOCUMENTS

JP 7-119892 A 5/1995
JP 2010-236560 A 10/2010
(Continued)

*Primary Examiner* — Joseph D. Pape
(74) *Attorney, Agent, or Firm* — Birch, Stewart, Kolasch & Birch, LLP

(57) ABSTRACT

A columnar member able to absorb more energy at the time of collision without an accompanying increase in weight, that is, a columnar member 100 having at least a top plate 12 and two vertical walls 14, 16 connected to the top plate 12 at ridge parts 15 at both side edges 12a, 12b of the top plate and extending along the ridge parts 15, which columnar member having a bend inducing part 22 at least at part of the top plate 12 and having soft parts 14b, 16b at the two vertical walls 14, 16 at positions adjoining the ridge parts 15 and corresponding to the bend inducing part 22 in a direction of extension of the columnar member 100, the bend inducing part 22 being a part with a strength lower than the parts adjoining the bend inducing part 22 at the top plate 12, the soft parts 14b, 16b being parts with yield strengths lower than the parts adjoining the soft parts 14b, 16b at the vertical walls 14, 16, maximum lengths of the soft parts 14b, 16b in the direction of extension of the columnar member 100 being 0.01 time to 0.15 time the heights of the vertical walls 14, 16.

8 Claims, 41 Drawing Sheets

(58) Field of Classification Search
USPC .................................................. 296/187.09
See application file for complete search history.

(56) References Cited

U.S. PATENT DOCUMENTS

| | | | |
|---|---|---|---|
| 2015/0151792 A1* | 6/2015 | Mori | B62D 21/152 |
| | | | 296/187.09 |
| 2017/0253276 A1 | 9/2017 | Shimizu | |
| 2018/0304927 A1* | 10/2018 | Hirose | B62D 21/15 |
| 2019/0054958 A1 | 2/2019 | Marquez Duran | |

FOREIGN PATENT DOCUMENTS

| | | | |
|---|---|---|---|
| JP | 2010-241337 A | | 10/2010 |
| JP | 2015-105024 A | | 6/2015 |
| JP | 2017159895 A | * | 9/2017 |
| JP | 6268780 B2 | | 1/2018 |
| JP | 2019-506323 A | | 3/2019 |

* cited by examiner

COLUMNAR MEMBER

FIELD

The present invention relates to a columnar member.

BACKGROUND

In an automobile, to lighten the weight and increase the rigidity of the vehicle, columnar members formed by plastically deforming sheets to cross-sectional hat shapes are welded together to form the car body. Further, to secure survival space in a passenger compartment at the time of an accident involving collision of an automobile, increasing the maximum reaction force and absorption energy at the time of bending deformation is sought from the columnar members.

For example, PTL 1 discloses a columnar member which has a top wall extending along a predetermined main axis, side walls extending along two side edges of the top wall, and flange parts extending at the side walls along edge parts at opposite sides from the top wall and which has an approximately hat shaped cross-section vertical to the axis. The columnar member is provided with low strength parts adjoining the side edge parts connected to the top wall and having a strength lower than the strength of a base member.

CITATIONS LIST

Patent Literature

[PTL 1] Japanese Patent No. 6268780

SUMMARY

Technical Problem

To achieve both the secured collision safety and lighter weight demanded from vehicles, various improvements of not only the materials used for the vehicles, but also the designs are sought. In particular, greater compactness and higher efficiency are strongly sought from the front side members, rear side members, or center pillar and other members mainly absorbing the energy at the time of a collision. These members absorb impact by bending deformation, but the members rapidly end up weakening along with bending deformation. For this reason, adding reinforcing members to these members has been studied a lot, but addition of reinforcing members ends up increasing the weight. Further, due to the reinforcing members, the reinforced parts become too strong and the envisioned deformation modes cannot be realized. Conversely, there was the problem of causing significant deterioration of the impact absorbing performance.

Further, recently, the sources of drive power of automobiles have been shifting from the conventional internal combustion engines to electric motors and other small sized sources of drive power. If the sources of drive power of automobiles are made smaller, the degree of freedom in the structures of car bodies, which had been restricted due to the presence of internal combustion engines, increases. For example, the spaces in which internal combustion engines had been provided become able to be utilized as spaces for passenger compartments. Vehicle designs answering the needs of users for larger passenger compartments are made possible.

On the other hand, the spaces in which internal combustion engines are provided do not endanger passengers in passenger compartments even if crushed at the time of a collision, so have been utilized for securing collision safety. For this reason, if utilizing the spaces in which internal combustion engines are provided for enlarging passenger compartments, there is a possibility that crushing of the car bodies occurring at the time of collision would endanger the passengers in the passenger compartments and the problem would arise that safety at the time of collision would no longer be able to be secured.

In the above way, if utilizing the spaces in which internal combustion engines are provided to enlarge passenger compartments, the spaces which had been utilized for securing collision safety would be reduced, so it is desirable to absorb the impact energy in narrower spaces.

The art described in PTL 1 provides low strength parts adjoining the side edge parts connected to the top wall at the side walls of a columnar member having a hat shape cross-section so as to keep down the rapid decrease in the reaction force during bending deformation and raise the absorption energy, but there is room for further improvement if envisioning absorption of impact energy by a narrower space. Further, the art described in PTL 1 is art envisioning collision from the side of a columnar member and does not envision bending deformation in the case of a compressive load being applied in an axial direction of a columnar member.

Therefore, the present invention has as its object the provision of a columnar member able to absorb more energy at the time of collision without an accompanying increase in weight.

Solution to Problem

The gist of the present invention is as follows:
(1) A columnar member having at least
   a top plate and
   two vertical walls connected to the top plate at ridge parts at both side edges of the top plate and extending along the ridge parts,
   which columnar member
   having a bend inducing part at least at a part of the top plate and
   each of the two vertical walls having a soft part at a position adjoining the ridge part and corresponding to the bend inducing part in a direction of extension of the columnar member,
   the bend inducing part being a part with a strength lower than a part adjoining the bend inducing part at the top plate,
   each of the soft parts having yield strength lower than a part adjoining each of the soft parts at the vertical wall, each of maximum lengths of each of the soft parts in the direction of extension of the columnar member being 0.01 time to 0.15 time a height of the vertical wall.
(2) The columnar member according to (1), where each of the lengths of each of the soft parts in the height direction of the vertical wall is 0.15 time to 0.9 time the height of the vertical wall.
(3) The columnar member according to (1) or (2), where each of ratios of each of yield strengths of each of the soft parts with each of yield strengths of each of parts adjoining each of the soft parts at the vertical walls is 0.2 to 0.8.

(4) The columnar member according to any one of (1) to (3), wherein end parts of the soft parts at the top plate sides are positioned at end parts of the ridge parts connecting the top plate and the vertical walls at the vertical wall sides.

(5) The columnar member according to any one of (1) to (4), wherein the bend inducing part is comprised of a recessed part, hole, or projecting part provided at the top plate.

(6) The columnar member according to any one of (1) to (4), wherein
the top plate has at least two reinforcing parts provided separated from each other in the direction of extension of the columnar member, and
the bend inducing part is positioned between the reinforcing parts separated from each other in the direction of extension of the columnar member.

(7) The columnar member according to any one of (1) to (5), wherein the bend inducing part includes recessed part, hole, or projecting part provided at the ridge part connecting the top plate and the vertical wall.

(8) The columnar member according to any one of (1) to (7), forming a front side member or rear side member of a vehicle.

Advantageous Effects of Invention

According to the present invention, a columnar member able to absorb more energy at the time of collision without an accompanying increase in weight is provided.

DESCRIPTION OF EMBODIMENTS

Figure 1:
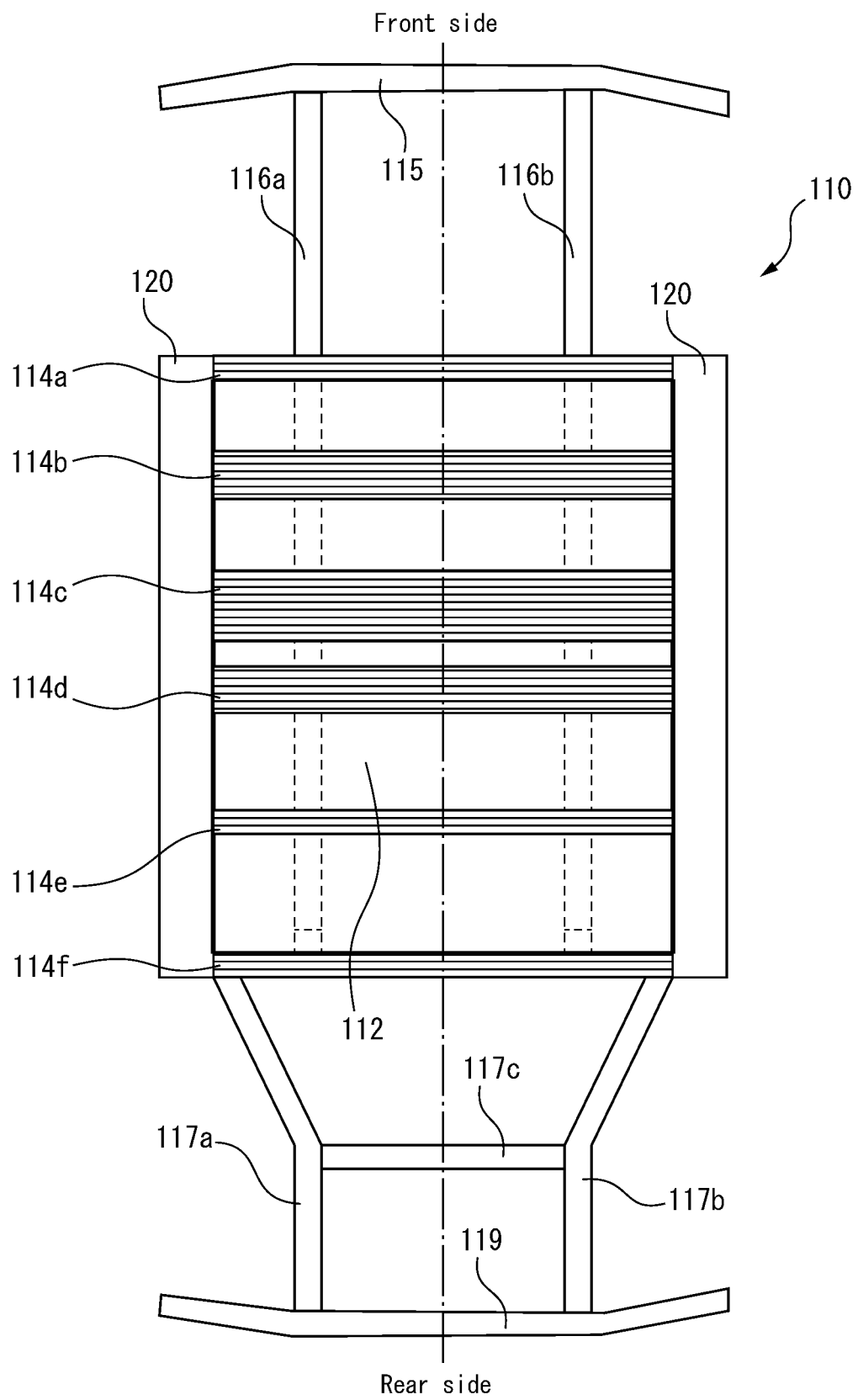
FIG. 1 is a schematic view for explaining a structure of a car body floor of an automobile according to an embodiment and a plan view of the car body floor seen from above.
Figure 2:
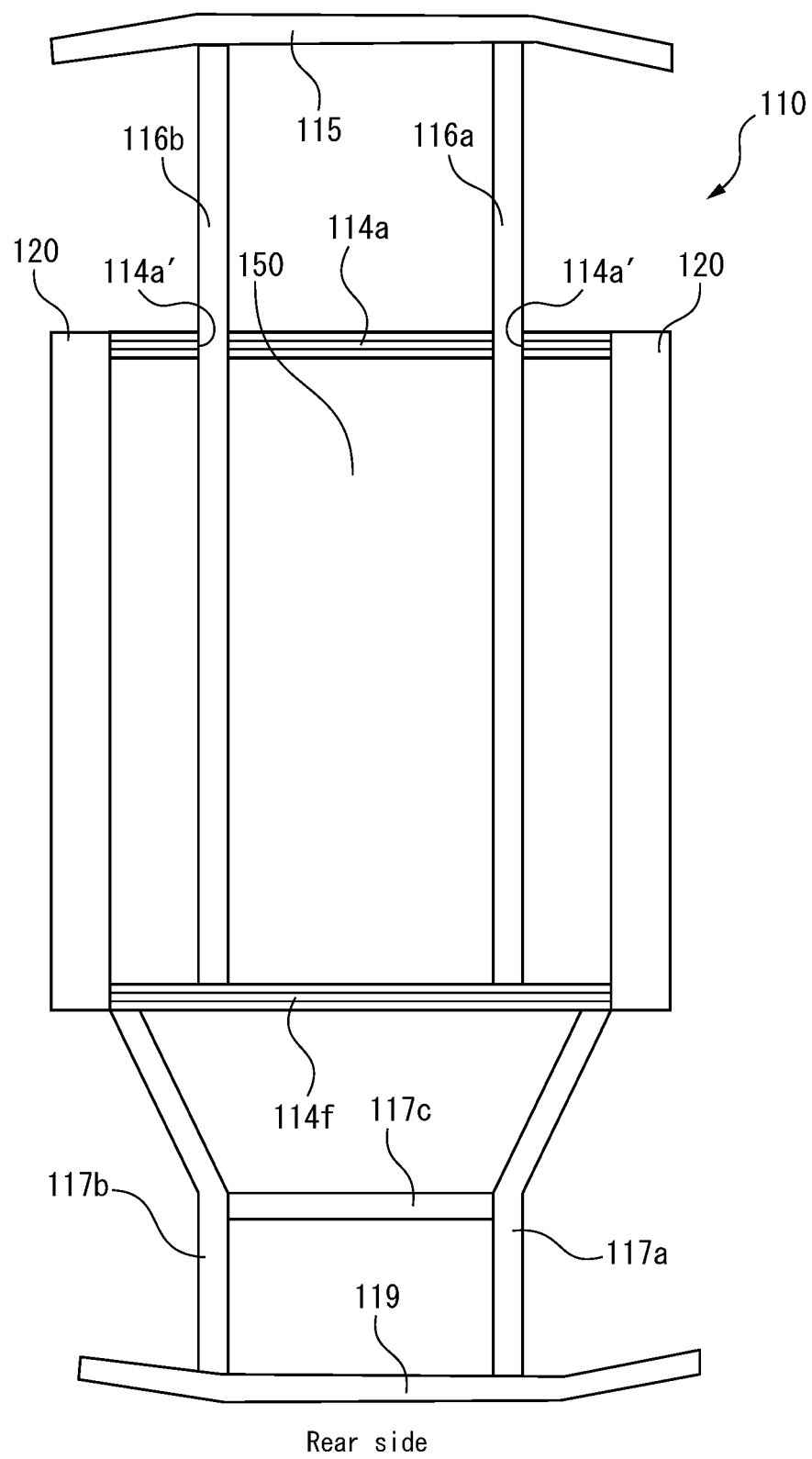
FIG. 2 is a view of the car body floor seen from below.

Below, referring to the drawings, a columnar member according to an embodiment of the present invention will be explained. First, referring to FIG. 1 and FIG. 2, the configuration of a car body floor 110 to which a columnar member according to an embodiment of the present invention is applied will be explained. FIG. 1 is a schematic view for explaining a structure of the car body floor 110 of an automobile according to the present embodiment and a plan view of the car body floor 110 seen from above. FIG. 2 is a view of the car body floor 110 seen from below.

As shown in FIG. 1, the car body floor 110 has a floor panel 112, floor cross members 114a to 114f, front bumper 115, front side members 116a, 116b, rear side members 117a, 117b, rear bumper 119, and side sills 120.

The side sills 120 extend on the left and right side surfaces of the automobile in the front-back direction (vehicle length direction) of the automobile. The floor cross members 114a to 114f extend in the left-right direction (vehicle width direction) of the automobile. The floor cross members 114a to 14f are joined at the two end parts to the left and right side sills 120 by welding, riveting, bolting, etc. (below, referred to as "welding etc.")

The floor cross members 114b to 114e are arranged extending in the vehicle width direction in the region surrounded by the left and right side sills 120, floor cross member 114a, and floor cross member 114f.

Below the floor cross members 114b to 114e, a floor panel 112 is arranged. The floor panel 112 is fastened to the floor cross members 114a to 114f and side sills 120 by welding etc.

The floor cross members 114a to 114f may all be comprised of hat shape members (hat shape cross-section members). Further, the floor cross members 114a to 114f may also be comprised of hollow tubular members and may have rectangular shaped cross-sections perpendicularly interesting the longitudinal direction.

At the insides from the side sills 120 in the vehicle width direction, two front side members 116a, 116b extend in the vehicle length direction. The rear side end parts of the front side members 116a, 116b abut against the floor cross member 114f and are fastened by welding etc. to the floor cross member 114f.

The top surfaces of the front side members 116a, 116b may abut against the floor panel 112 and may be fastened to the floor panel 112 by welding etc.

At the rear side of the floor cross member 114f, two rear side members 117a, 117b extend in the vehicle length direction. The end parts of the rear side members 117a, 117b at the front side are fastened by welding etc. to the floor cross member 114f. At the end parts of the rear side members 117a, 117b at the rear side, the rear bumper 119 is fastened. Further, between the rear side members 117a, 117b in the front-rear direction, a cross member 117c connecting the rear side member 117a and the rear side member 117b is arranged. The end parts of the cross member 117c are respectively fastened by welding etc. to the rear side member 117a and rear side member 117b.

As explained above, the front side members 116a, 116b, rear side member 117a, 117b, and other members are members mainly responsible for absorbing energy at the time of collision when the vehicle is involved in a collision. Greater compactness and higher efficiency are being strongly demanded.

The inventors discovered to place soft parts in ranges near bending inducing parts of these members to achieve both elimination of weakening of the members along with bending deformation and avoidance of increased weight. According to the present invention, it is possible to decrease the weakening of these members accompanying bending deformation without adding reinforcing members.

Figure 3:
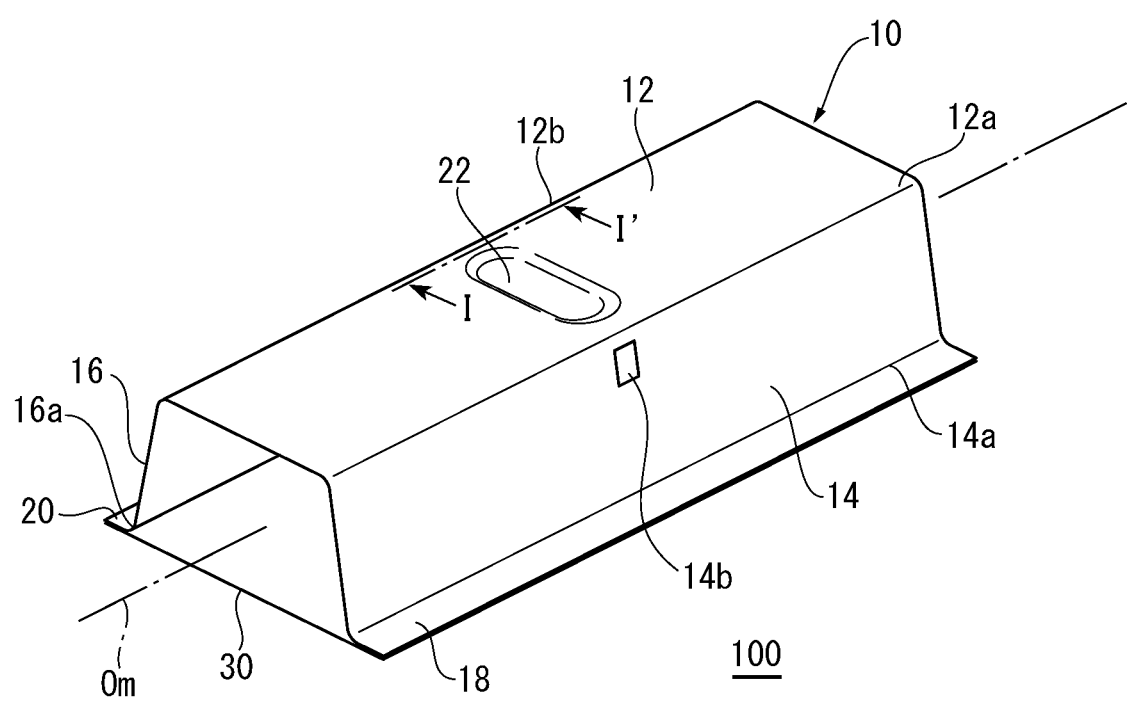
FIG. 3 is a perspective view showing the configuration of a columnar member according to an embodiment of the present invention.

FIG. 3 is a perspective view showing the configuration of a columnar member 100 according to an embodiment of the present invention. The columnar member 100 is particularly suitable for application to the front side members 116a, 116b or the rear side members 117a, 117b among the members forming the car body floor 110. Note that, the columnar member 100 may also be applied to the floor cross members 114a to 114f or the side sills 120 or other component elements of the car body floor 110 shown in FIG. 1. Furthermore, the columnar member 100 may also be applied to the vehicle center pillar, A-pillar, B-pillar, or other component elements other than the car body floor 110.

As shown in FIG. 3, the columnar member 100 has at least a top plate 12 and two vertical walls 14, 16 connected with the top plate 12 at the ridge parts of the two side edges 12a, 12b of the top plate 12 and extending along the ridge parts.

Below, the case where the columnar member 100 has a hat shape member 10 and a plate-shaped member 30 will be used as an example in the explanation. The hat shape member 10 and the plate-shaped member 30 are, for example, formed from steel sheets.

The hat shape member 10 is provided with a plate shaped top plate 12, vertical walls 14, 16 connected to the top plate 12 at ridge parts of the two side edges 12a, 12b of the top plate 12 and extending along the ridge parts, and flange parts 18, 20 extending along the edge parts 14a, 16a at the opposite sides of the vertical walls 14, 16. The direction of the main axis Om shown in FIG. 3 shows the longitudinal direction in which the columnar member 100 extends. The main axis Om may be a line passing through the center of gravity of the cross-section perpendicular to the longitudinal direction of the columnar member 100. Note that, the direction in which the columnar member 100 extends is not limited to a straight direction. The columnar member 100 may also extend in any curved direction.

At least part of the top plate 12 of the hat shape member 10 is formed with a bend inducing part 22. Further, the vertical wall 14 is formed with a soft part 14b. Similarly, the vertical wall 16 is formed with a soft part 16b. The soft parts 14b, 16b are provided at positions corresponding to the bend inducing part 22 in the direction along the main axis Om, that is, the direction of extension of the columnar member 100 (longitudinal direction of columnar member 100). Here, "provided at positions corresponding to" include the case where the soft parts 14b, 16b are provided at the same positions as the bend inducing part 22 in the direction of extension of the columnar member 100 and the case where at least part of the ranges in which the soft parts 14b, 16b are provided overlap the range in which the bend inducing part 22 is provided in the direction of extension of the columnar member 100.

Figure 4:
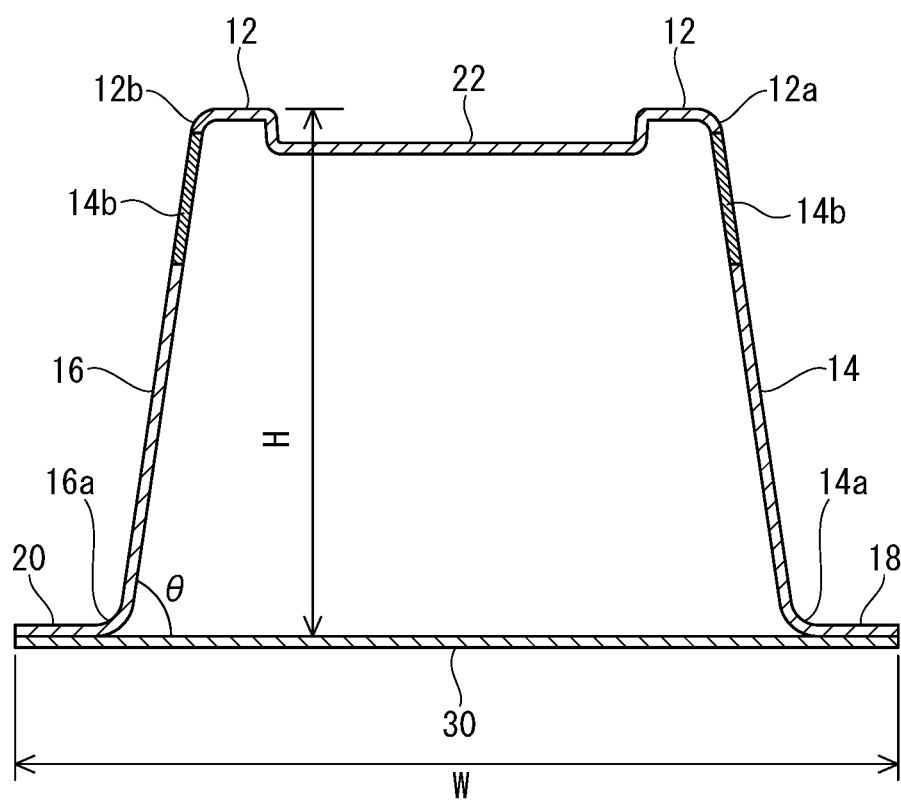
FIG. 4 is a cross-sectional view showing a cross-section (transverse section) taken at a plane vertical to a longitudinal direction of a direction of the main axis of the columnar member at a bend inducing bead position.

FIG. 4 is a cross-sectional view showing a cross-section (transverse section) cut at a plane vertical to a longitudinal direction of the direction of the main axis Om of the columnar member 100 at the position of the bend inducing bead 22. As shown in FIG. 4, the transverse section of the hat shape member 10 is substantially hat shaped. The plate-shaped member 30 is joined to the flange parts 18, 20 of the hat shape member 10 by spot welding, line welding, etc.

The bend inducing part 22 is a part with a lower strength than the parts adjoining the bend inducing part 22 at the top plate 12. Here, "lower strength than the parts adjoining" means the part initially deforms when the columnar member 100 is subjected to a compressive load in the longitudinal direction. Therefore, if a load is applied in the longitudinal direction of the columnar member 100, the columnar member 100 will deform by bending at the position of the bend inducing part 22. In the example shown in FIG. 3 and FIG. 4, the bend inducing part 22 is comprised of a bend inducing bead (recessed part) formed by a recess of the surface side of the top plate 12 (in FIG. 1, top side of top plate 12). The bend inducing part 22 is formed by press forming the steel sheet of the base member of the hat shape member 10. The bend inducing part 22 may also be simultaneously formed with shaping of the hat shape member 10 at the time of press working for bending the steel sheet and press forming the hat shape member 10.

The front side members 116a, 116b or the rear side member 117a, 117b forming the car body floor 110 are subjected to a large impact force in the vehicle length direction and deform by compression when the automobile is involved in a collision. If the columnar members 100 are used for the front side members 116a, 116b or the rear side members 117a, 117b, when subjected to a large impact force in the vehicle length direction due to a collision, a compressive load acts in the direction of the main axis Om of the columnar members 100 and the columnar members 100 deform by bending. The energy of the collision is absorbed by bending deformation of the columnar members 100.

The bend inducing part 22 is formed for providing an easily bendable location at the columnar member 100 and becomes a starting point for bending of the columnar member 100 when the columnar member 100 receives a compressive load in the direction of the main axis Om. Due to this, when the columnar member 100 is subjected to a compressive load, the columnar member 100 deforms by bending in a certain deformation mode envisioned in advance. Therefore, when the columnar member 100 is subjected to a compressive load, unenvisioned deformation of the columnar member 100 is suppressed and safety is secured.

By providing the bend inducing part 22, when the columnar member 100 is subjected to a compressive load in the direction of the main axis Om, bending deformation occurs at the columnar member 100 at the position of the bend inducing part 22 and the columnar member 100 bends at the position of the bend inducing part 22. The reaction force in the direction of the main axis Om of the columnar member 100 when a compressive load is applied increases until the columnar member 100 bends due to the bending deformation and decreases if the columnar member 100 is bent.

When the columnar member 100 bends, a groove-shaped recess is formed in the top plate 12 in the direction perpendicular to the main axis Om at the position of the bend inducing part 22 at the inside of the bend. The more the columnar member 100 deforms and the greater the bend, the narrower the width of the groove-shaped recess and the closer the distance between the facing inside walls of the groove-shaped recess. Further, if the facing inside walls of the groove-shaped recess collide with each other, the columnar member 100 will stop bending temporarily and the decreasing reaction force will start to increase.

The soft parts 14b, 16b are provided at the two vertical walls 14, 16 of the hat shape member 10 at positions adjoining the ridge parts in a direction perpendicular to the top plate 12 and corresponding to the bend inducing part in the direction of extension of the columnar member 100. The soft parts 14b, 16b are comprised as parts lower in yield strengths (or tensile strengths) than parts adjoining the soft parts 14b, 16b at the vertical walls 14, 16 of the hat shape member 10. The soft parts 14b, 16b are provided so as to cause earlier formation of the groove-shaped recess, cause the facing inside walls of the groove shape to collide with each other earlier in the bending deformation, and suppress the decrease in the reaction force of the columnar member 100 in the process of bending deformation of the columnar member 100. The soft parts 14b, 16b are formed by selective hardening in hot stamping or partial tempering to soften parts of the vertical walls 14, 16. The soft parts 14b, 16b have strengths of 0.2 to 0.8 time of the base member strength (yield strength) at other parts of the steel sheet, preferably 0.2 to 0.6 time.

As one example, the soft parts 14b, 16b are made rectangular shapes in a plan view seen from a perspective in a direction vertical to the vertical walls 14, 16. The maximum lengths I of the soft parts 14b, 16b in the direction of extension of the columnar member 100 (direction along main axis Om) are made 0.01 time to 0.15 time the heights H of the vertical walls 14, 16. By making the lengths I of the soft parts 14b, 16b in the direction along the main axis Om 0.01 time to 0.15 time the heights H of the vertical walls 14, 16, after bending deformation of the columnar member 100 starts at the position of the bend inducing part 22, the facing inside walls of the groove shape collide with each other early in the bending deformation and the facing inside walls of the groove shape collide with each other in stages over several times, so the drop in the reaction force is suppressed and the amount of absorption of impact energy increases.

On the other hand, if the lengths I of the soft parts 14b, 16b in the direction along the main axis Om are not made 0.01 time to 0.15 time the heights H of the vertical walls 14, 16, the facing inside walls of the groove shape do not collide with each other early in the bending deformation and the facing inside walls of the groove shape do not collide with each other in stages over several times, so the reaction force of the columnar member 100 falls and the amount of absorption of impact energy decreases.

Figure 6A:
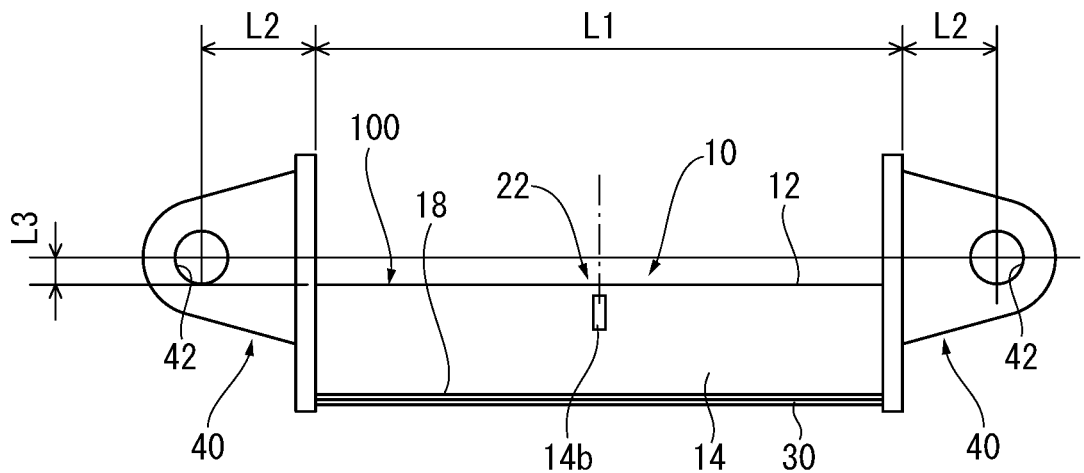
FIG. 6A is a schematic view showing in time series a state of progression of bending deformation of a columnar member when the columnar member is subjected to a compressive load in the direction of the main axis.
Figure 6B:
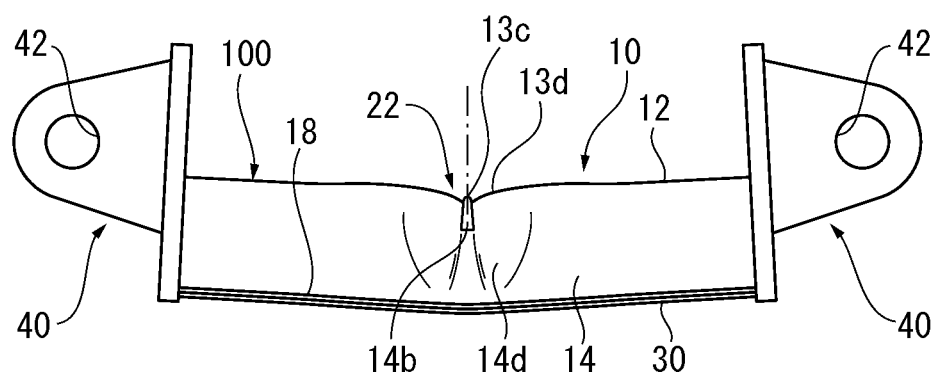
FIG. 6B is a schematic view showing in time series a state of progression of bending deformation of a columnar member when the columnar member is subjected to a compressive load in the direction of the main axis.
Figure 6C:
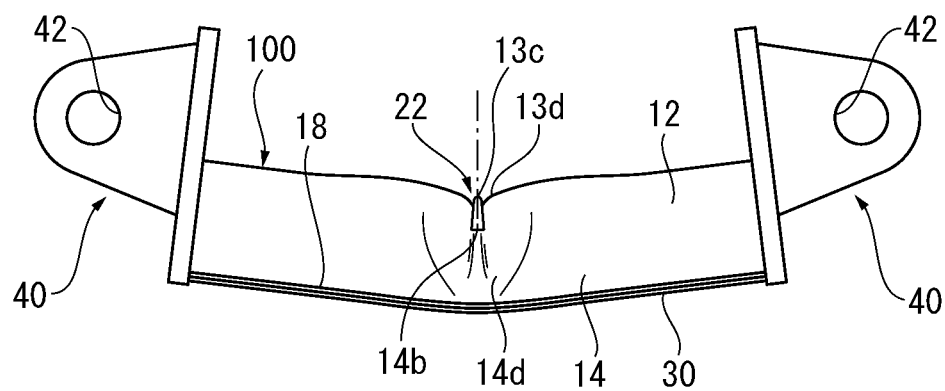
FIG. 6C is a schematic view showing in time series a state of progression of bending deformation of a columnar member when the columnar member is subjected to a compressive load in the direction of the main axis.

FIG. 6A to FIG. 6C are schematic views showing in time series the states of progression of bending deformation of a columnar member 100 when a columnar member 100 with lengths I of the soft parts 14b, 16b in the direction along the main axis Om made 0.01 time to 0.15 time the heights H of the vertical walls 14, 16 is subjected to a compressive load in the direction of the main axis Om. Note that, in FIG. 6A to FIG. 6C, the positions of the one-dot chain lines show the positions of the bend inducing parts 22.

FIG. 6A shows tools 40 for applying a compressive load to the columnar member 100. To analyze the state of progression of bending deformation at the columnar member 100, shafts are inserted into holes 42 of the tools 40 at the two ends of the columnar member 100 and the deformation in the case where the shafts are made to approach each other is analyzed.

FIG. 6A shows the state when beginning to apply a compressive load in the longitudinal direction of the columnar member 100. In this state, while a compressive load is applied in the longitudinal direction of the columnar member 100, the surface of the top plate 12 of the hat shape member 10 and the surface of the plate-shaped member 30 are maintained as flat surfaces and the columnar member 100 does not yet bend. As explained above, the reaction force of the columnar member 100 when a compressive load is applied increases until the columnar member 100 bends.

Next, as shown in FIG. 6B, the shafts inserted into the holes 42 are made to approach each other so that a compressive load is applied in the longitudinal direction of the columnar member 100. When the columnar member 100 starts to bend at the position of the bend inducing part 22, wrinkle-like bulges 14d, 16d are formed at the vertical walls 14, 16 and a groove-shaped recess 13d is formed at the top plate 12 at the position of the bend inducing part 22 at the inside of the bend. Further, projecting parts 13c are formed at the top parts of the soft parts 14b, 16b.

Next, as shown in FIG. 6C, when the shafts inserted into the holes 42 are made to further approach each other, the columnar member 100 further bends and the facing inside walls of the groove shapes collide with each other on the back side of the projecting parts 13c.

Figure 7:
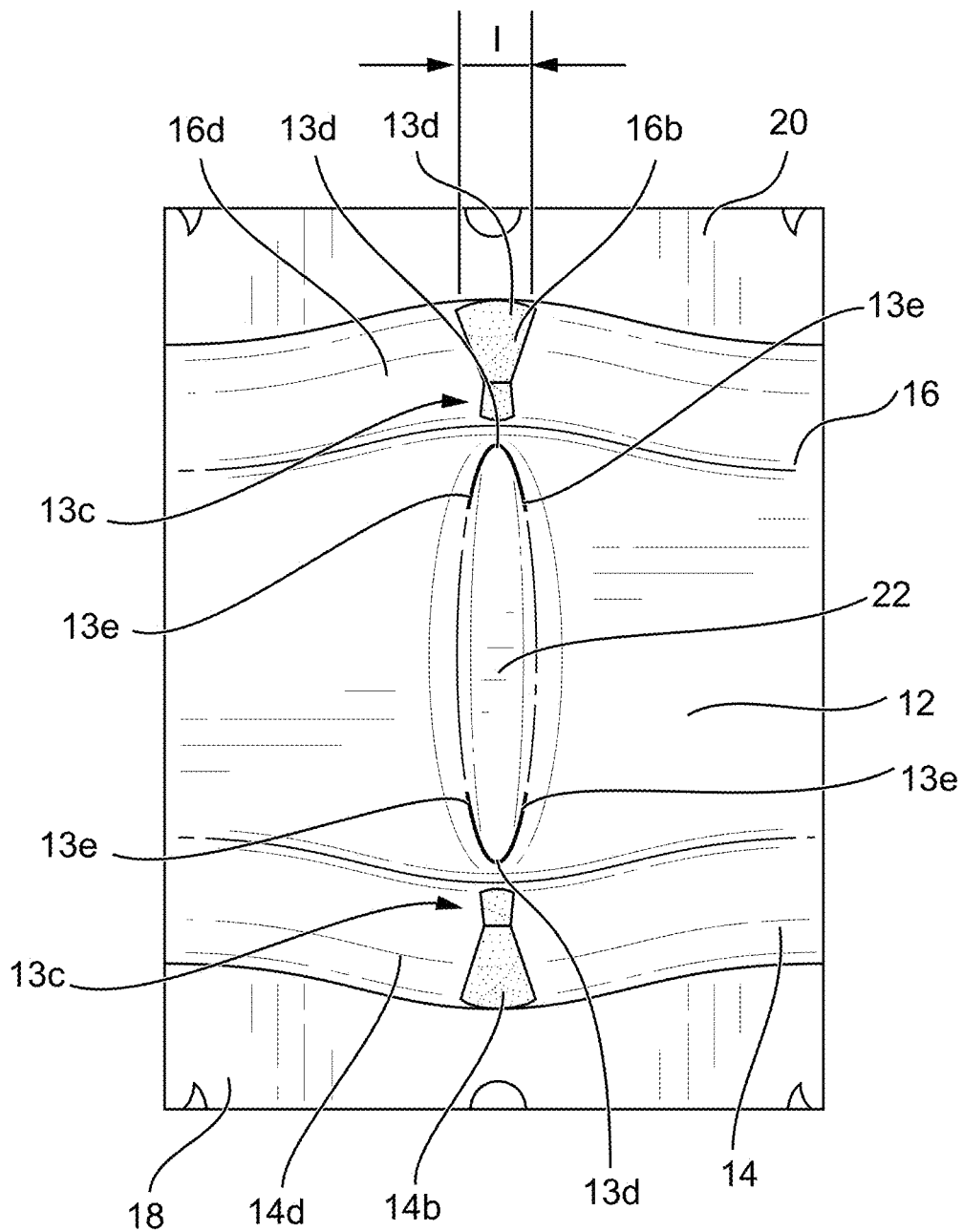
FIG. 7 is a schematic view showing a state of a vicinity of a bend inducing bead of the top plate of the columnar member seen from above at the timing shown in FIG. 6C.

FIG. 7 is a schematic view showing a state of a vicinity of a bend inducing part 22 of the top plate 12 of the columnar member 100 seen from above at the timing shown in FIG. 6C. As shown in FIG. 7, at the positions of the soft parts 14b, 16b, projecting parts 13c are formed at the top parts of the vertical walls 14, 16. Further, at the timing of FIG. 6C, the facing inside walls collide with each other at the back sides of the projecting parts 13c. By the facing inside walls of the groove shapes colliding with each other at the back sides of the projecting parts 13c, a drop in the reaction force of the columnar member 100 is suppressed. Furthermore, if bending deformation of the columnar member 100 progresses, the facing inside walls 13e of the groove-shaped recesses 13d collide with each other. Due to this, the drop in the reaction force of the columnar member 100 is further suppressed. Further, by the facing inside walls of the groove shapes at the back sides of the projecting parts 13c colliding with each other and the facing inside walls 13e of the groove-shaped recesses 13d at the surface side of the top plate 12 colliding with each other in stages at different timings, the drop in reaction force is suppressed by the plurality of collisions and the amount of absorption of the impact energy is increased.

On the other hand, if applying a compressive load under the same conditions as FIG. 6A to FIG. 6C to a columnar member 104 with lengths I of the soft parts 14b, 16b in the direction along the main axis Om not made 0.01 time to 0.15 time the heights H of the vertical walls 14, 16, the facing inside walls of the groove shapes do not collide with each other early and, further, do not collide with each other several times, so the reaction force of the columnar member 104 ends up falling along with the increase of the stroke of the compression.

Figure 8:
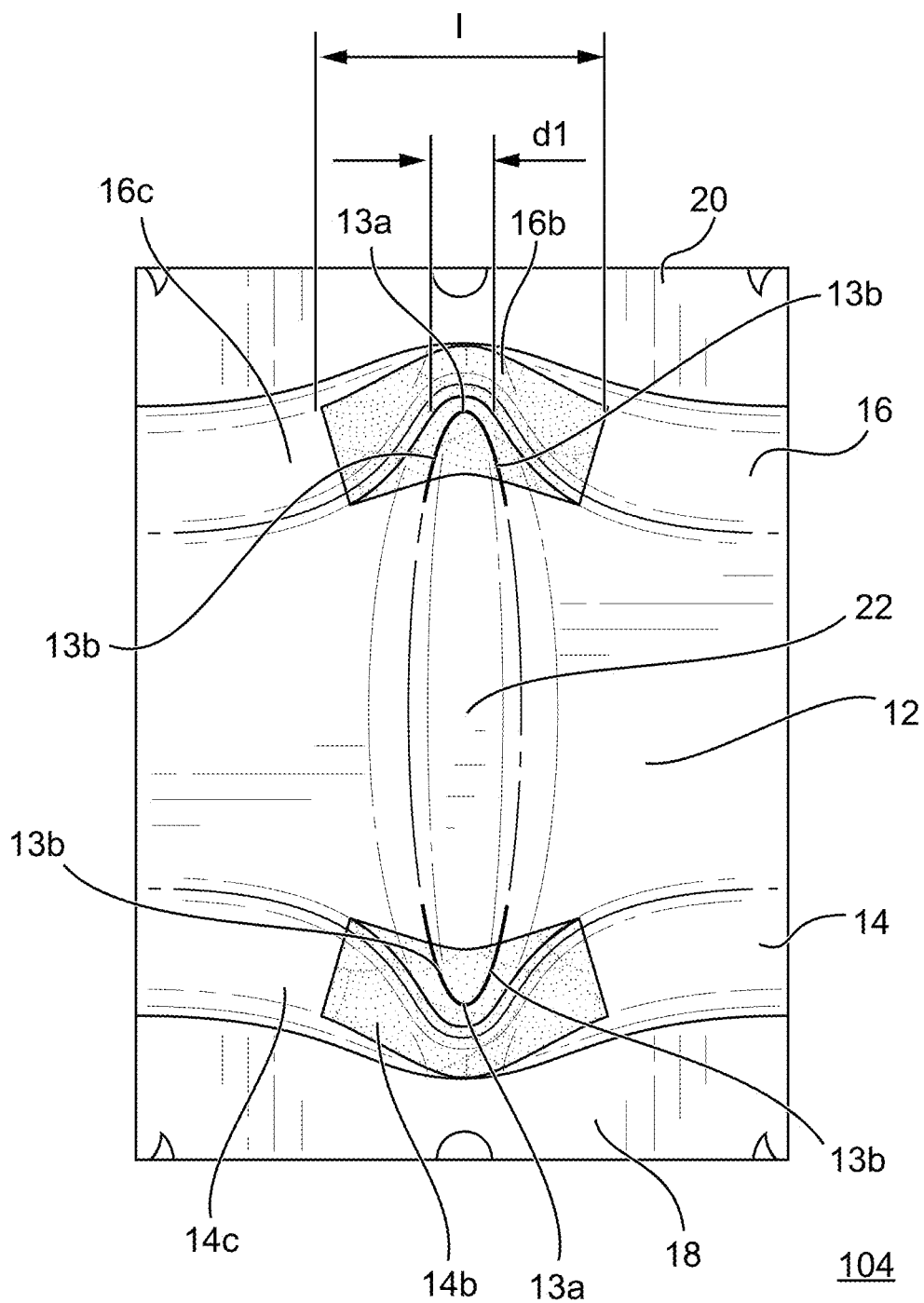
FIG. 8 is a schematic view showing a state of a vicinity of a bend inducing bead of the top plate of the columnar member seen from above at the same timing as FIG. 6C in the case where a columnar member with a length I of a soft part in the direction along the main axis Om not made 0.01 time to 0.15 time a height H of the vertical wall is subjected to a compressive load under the same conditions of FIG. 6A to FIG. 6C.

FIG. 8 is a schematic view showing the state of a vicinity of a bend inducing part 22 of the top plate 12 of the columnar member 104 seen from above at the same timing (after the elapse of a certain time T from the start of application of the compressive load) as FIG. 6C in the case where a columnar member 104 with lengths I of soft parts 14b, 16b in the direction along the main axis Om not made 0.01 time to 0.15 time the heights H of the vertical walls 14, 16 is subjected to a compressive load under the same conditions of FIG. 6A to FIG. 6C.

As shown in FIG. 8, even in the columnar member 104 with lengths I of the soft parts 14b, 16b in the direction of the main axis Om not made 0.01 time to 0.15 time the heights H of the vertical walls 14, 16, wrinkle-like bulges 14c, 16c are formed at the vertical walls 14, 16 and a recess 13a is formed at the top plate 12 at the position of the bend inducing part 22. However, if lengths I of the soft parts 14b, 16b in the direction of the main axis Om are not made 0.01 time to 0.15 time the heights H of the vertical walls 14, 16, the soft parts 14b, 16b end up deforming to recessed shapes overall and projecting parts 13c are not formed at the top parts of the soft parts 14b, 16b, so the facing inside walls of the groove shape do not collide with each other at the back sides of the projecting parts 13c. Further, the facing inside walls 13b of the groove-shaped recess 13a are separated by the width d1. At that time, the facing inside walls 13b do not collide with each other. Therefore, in the columnar member 104 with lengths I of the soft parts 14b, 16b in the direction of the main axis Om not made 0.01 time to 0.15 time the heights H of the vertical walls 14, 16, at the point of time of FIG. 8, the facing inside walls of the groove shape at the bent part do not collide with each other, so no force acts resisting bending and a drop in the reaction force cannot be suppressed.

Figure 5:
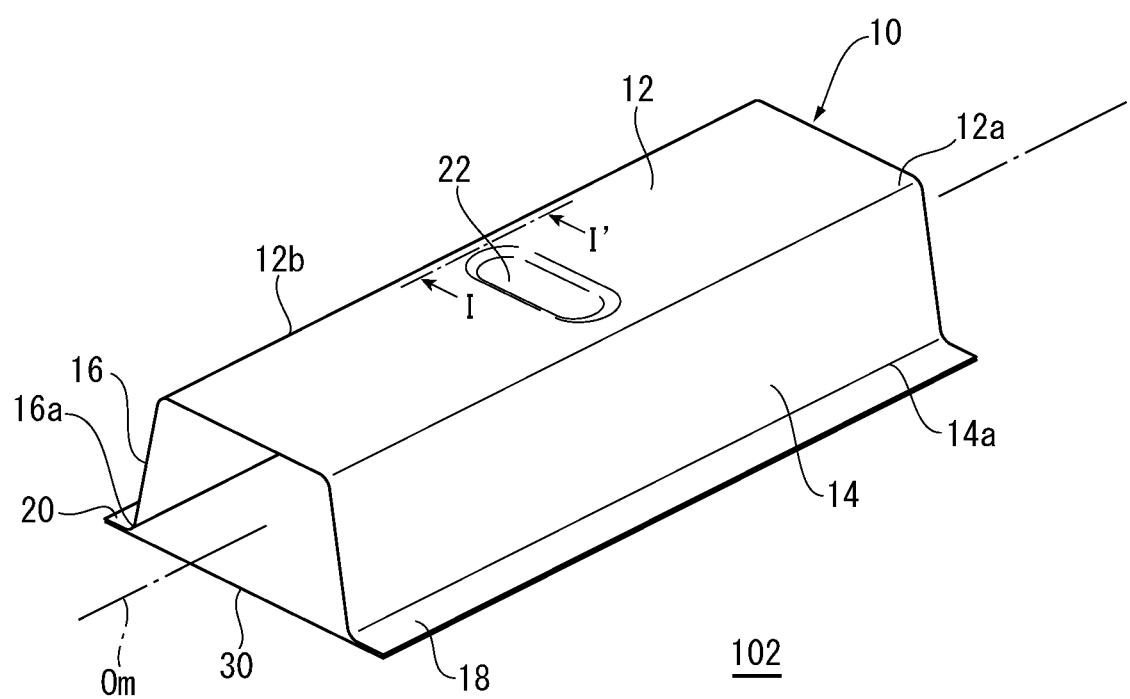
FIG. 5 is a perspective view showing the configuration of a columnar member of a base member model at which a bead part is not provided.

Next, the characteristics showing the relationship between the stroke and reaction force of a columnar member 100 with lengths I of the soft parts 14b, 16b in the direction along the main axis Om made 0.01 time to 0.15 time the heights H of the vertical walls 14, 16 according to the present embodiment will be explained in comparison with the characteristic of a columnar member 102 of the base member model at which the soft parts 14b, 16b are not provided. FIG. 5 is a perspective view showing the configuration of the columnar member 102 of the base member model at which soft parts 14b, 16b are not provided. The constitution of the columnar member 102 shown in FIG. 5 is the same as the columnar member 100 according to the present embodiment shown in FIG. 3 other than the point of the soft parts 14b, 16b not being provided.

Figure 9:
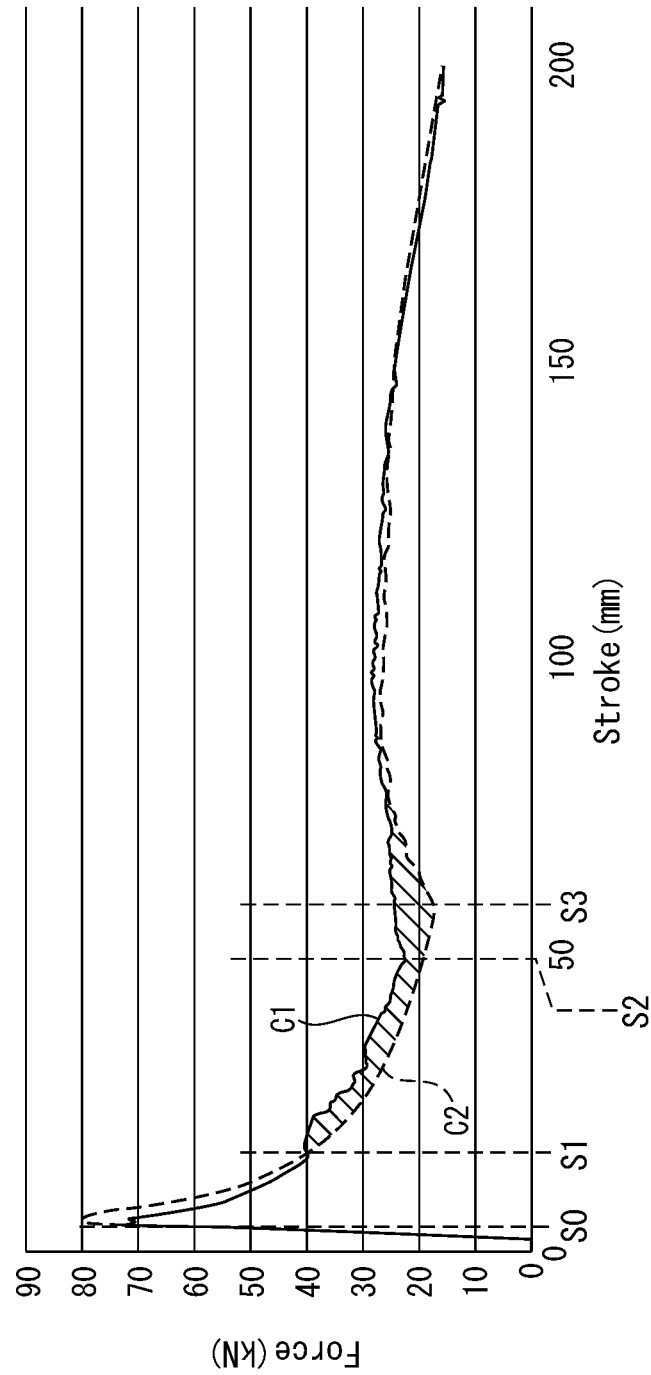
FIG. 9 is a graph showing a relationship between a stroke (abscissa) and reaction force (ordinate) if applying a compressive load in the direction of the main axis Om on a columnar member according to the present embodiment and a columnar member of a base member model.

FIG. 9 is a graph showing the relationship between the stroke (abscissa) and reaction force (ordinate) if applying a compressive load in the direction along the main axis Om to the columnar member 100 according to the present embodiment and the columnar member 102 of the base member model with lengths I of soft parts 14b, 16b in the direction of the main axis Om made 0.1 time the heights H of the vertical walls 14, 16. In FIG. 9, the characteristic C1 shown by the solid line shows the characteristic of the stroke and reaction force at the columnar member 100 of the present embodiment when making the lengths I of the soft parts 14b, 16b in the direction along the main axis Om 0.1 time the heights H of the vertical walls 14, 16. Further, the characteristic C2 shown by the broken line shows the characteristic of the stroke and reaction force at the columnar member 102 of the base member model.

Figure 10A:
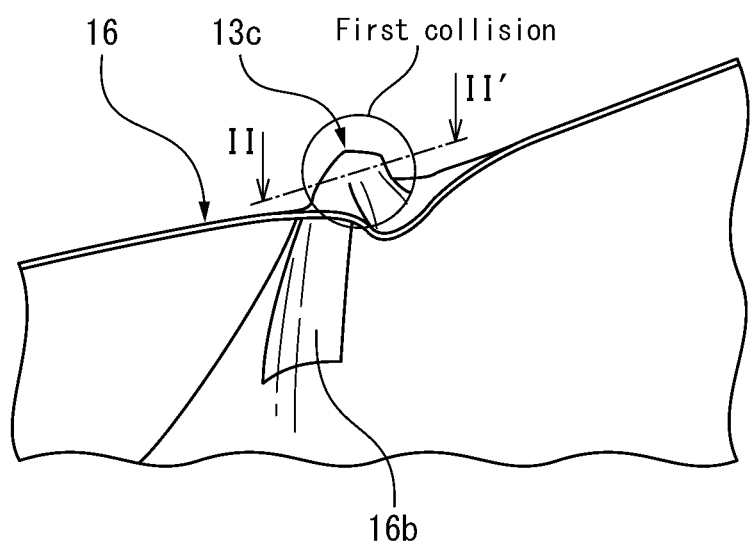
FIG. 10A is a view showing a state of bending deformation of the columnar member of the present embodiment at a timing of a stroke S1 in a characteristic of the stroke and reaction force shown in FIG. 9.
Figure 10B:
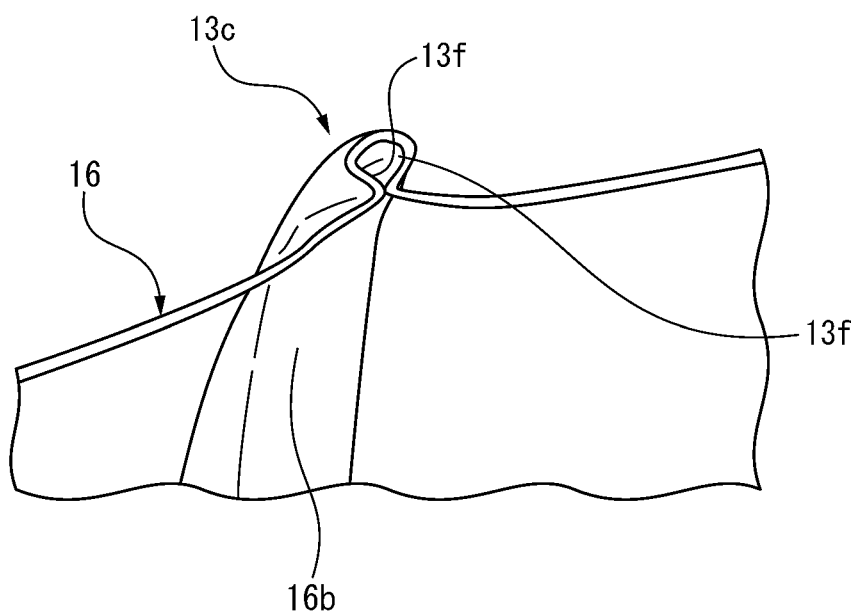
FIG. 10B is a cross-sectional view showing a state of breakage of a columnar member along a one-dot chain line II-II' shown in FIG. 10A.
Figure 10C:
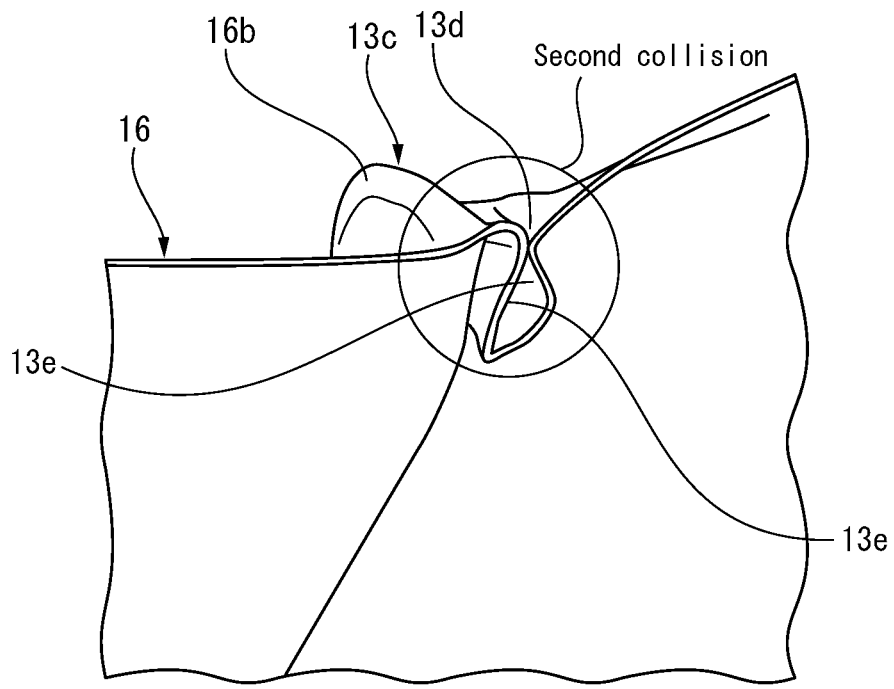
FIG. 10C is a view showing a state of bending deformation of the columnar member of the present embodiment at a timing of a stroke S2 in a characteristic of the stroke and reaction force shown in FIG. 9.
Figure 11A:
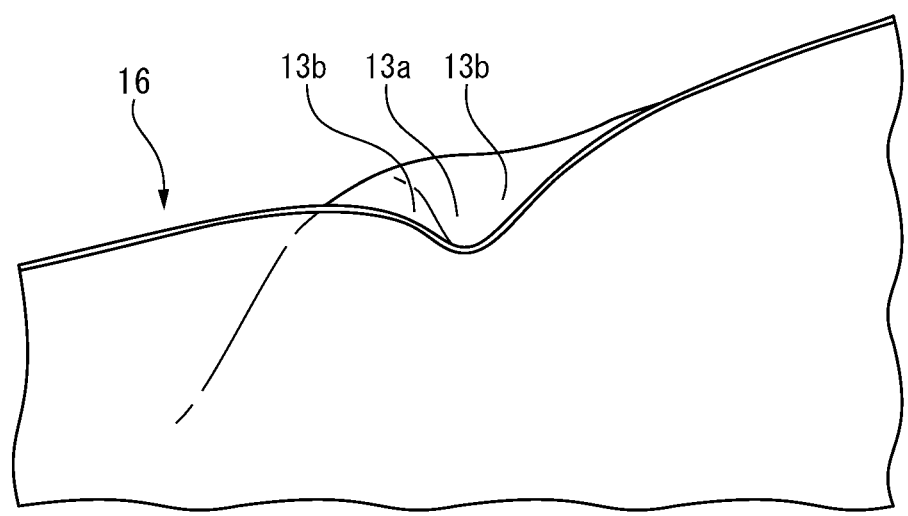
FIG. 11A is a view showing a state of bending deformation of the columnar member of the base member model at the timing of a stroke S1 in the characteristic of the stroke and reaction force shown in FIG. 9.
Figure 11B:
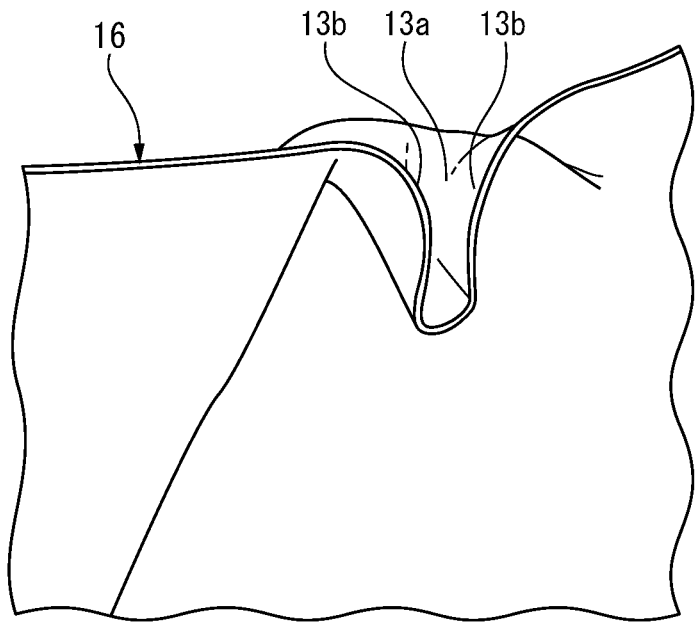
FIG. 11B is a view showing a state of bending deformation of the columnar member of the base member model at the timing of a stroke S2 in the characteristic of the stroke and reaction force shown in FIG. 9.
Figure 11C:
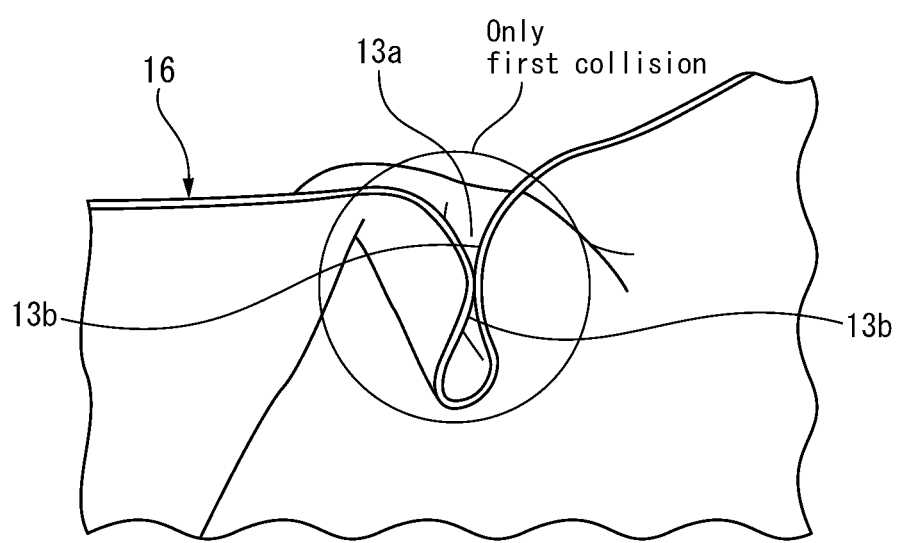
FIG. 11C is a view showing a state of bending deformation of the columnar member of the base member model at the timing of a stroke S3 in the characteristic of the stroke and reaction force shown in FIG. 9.

Further, FIG. 10A to FIG. 10C and FIG. 11A to FIG. 11C are views showing states of bending deformation of columnar members 100, 102 at the timings of strokes S1, S2, and S3 in the characteristics of the stroke and reaction force shown in FIG. 9. FIG. 10A to FIG. 10C are views showing states of bending deformation of columnar members 100 of the present embodiment with lengths I of soft parts 14b, 16b in the direction of the main axis Om made 0.1 time the heights H of the vertical walls 14, 16. Further, FIG. 11A to FIG. 11C show the states of bending deformation of columnar members 102 of the base member model. FIG. 10A and FIG. 10C and FIG. 11A to FIG. 11C show the states where columnar members 100, 102 broke along the one-dot chain lines I-I' shown in FIG. 3 and FIG. 5 at the respective timings. Further, FIG. 10B is a cross-sectional view showing the state where a columnar member 100 broke along the one-dot chain line II-IP shown in FIG. 10A.

FIG. 10A and FIG. 11A show states of bending deformation of columnar members 100, 102 at the timing of the stroke S1 shown in FIG. 9. Further, FIG. 10C and FIG. 11B show states of bending deformation of columnar members 100, 102 at the timing of the stroke S2 shown in FIG. 9. Further, FIG. 11C shows a state of bending deformation of a columnar member 102 at the timing of the stroke S3 shown in FIG. 9.

As shown in FIG. 9, if applying a compressive load to columnar members 100, 102 in the direction of the main axis Om, until the stroke reaches S0, the reaction force increases along with an increase of the stroke. If the stroke reaches S0, the columnar members 100, 102 bend at the position of the bend inducing part 22.

Starting from the stroke S0, the bending deformation of the columnar member 100 progresses. Along with the increase of the stroke, the reaction force falls. In the columnar member 100 of the present embodiment, a groove-shaped recess 13d is formed in the top plate 12. The lengths I of the soft parts 14b, 16b in the direction along the main axis Om are not made 0.1 time the heights H of the vertical walls 14, 16, so due to bending of the vertical walls 14, 16 at the positions of the soft parts 14b, 16b, projecting parts 13c bulging outside are formed at the top parts of the vertical walls 14, 16. On the other hand, in the columnar member 102 of the base member model, a groove-shaped recess 13a is formed in the top plate 12, but since there are no soft parts 14b, 16b with lengths I made 0.01 time to 0.15 time the heights H of the vertical walls 14, 16, no projecting parts 13c are formed at the columnar member 100 of the present embodiment. Until the stroke reaches S1, at both the characteristic C1 and the characteristic C2, the reaction force continuously falls along with an increase of the stroke.

If the stroke reaches S1, at the columnar member 100 of the present embodiment, as shown in FIG. 10A and FIG. 10B, the back sides of the projecting parts 13c formed at the top parts of the vertical walls 14, 16 become groove shaped. The facing inside walls 13f of the groove shape collide with each other (first collision). In this way, in the columnar member 100 of the present embodiment, the lengths I of the soft parts 14b, 16b are made 0.1 time the heights H of the vertical walls 14, 16, so projecting parts 13c bulging to the outside are formed at the top parts of the vertical walls 14, 16. At the time when the stroke reaches S1, the facing inside walls 13f of the groove shape collide with each other at the rear sides of the projecting parts 13c, so it is possible to cause a collision early. Due to this, at the solid line characteristic C1 shown in FIG. 9, the reaction force temporarily increases after the stroke S1. After that, until the stroke S2, the reaction force of the characteristic C1 gradually decreases.

On the other hand, at the columnar member 100 of the base member model, as shown in FIG. 11A, even if the stroke reaches S1, nothing corresponding to the projecting parts 13c of the columnar member 100 of the present embodiment are formed. Further, a relatively large space is formed between the facing inside walls 13b of the groove-shaped recess 13a, so at that stage, no collision occurs. Therefore, in the characteristic C2 of the broken line shown in FIG. 9, the reaction force continues to decrease even after the stroke S1.

When the stroke reaches S2, at the columnar member 100 of the present embodiment, as shown in FIG. 10C, the facing inside walls 13e of the groove-shaped recess 13d collide with each other (second collision). Due to this, in the characteristic C1 of the solid line shown in FIG. 9, the reaction force temporarily increases after the stroke S2 on. After that, the reaction force of the characteristic C1 remains substantially constant even if the stroke increases.

On the other hand, at the columnar member 102 of the base member model, as shown in FIG. 11B, even if the stroke reaches S2, the facing inside walls 13b of the groove-shaped recess 13a still do not collide with each other and a space is present between the facing inside walls 13b. For this reason, in the characteristic C2 of the broken line shown in FIG. 9, the reaction force continues to decrease even after the stroke S2.

If the stroke reaches S3, at the columnar member 102 of the base member model, as shown in FIG. 11C, the facing inside walls 13b of the groove-shaped recess 13a finally collide with each other. Due to this, in the characteristic C2 of the broken line shown in FIG. 9, the reaction force increases after the stroke S3, after that, in the same way as the characteristic C1, the reaction force remains substantially constant even if the stroke increases.

In the above way, at the characteristic C1 of the columnar member 100 according to the present embodiment with the lengths I of the soft parts 14b, 16b in the direction along the main axis Om made 0.1 time the heights H of the vertical walls 14, 16, the inside walls 13f and inside walls 13e collide with each other a total of two times at timings of the stroke S1 and stroke S2, so a drop in the reaction force after the stroke S1 is suppressed. Due to this, a large reaction force can be generated by a small stroke, so it becomes possible to efficiently absorb energy at the time of collision in a smaller space.

On the other hand, at the columnar member 102 of the base member model, the facing inside walls 13b do not collide with each other until reaching the stroke S3, so the reaction force continues to decrease until the inside walls 13b collide with each other. Therefore, at the columnar member 102 of the base member model, compared to the columnar member 100 of the present embodiment, the reaction force generated at the time of the same stroke ends up falling more and a larger space is required for absorbing the same impact energy as the columnar member 100 of the present embodiment.

In FIG. 9, the area of the region surrounded by the characteristic C1 or the characteristic C2 and the abscissa shows the magnitude of the impact energy absorbed by bending deformation of the columnar member 100. According to the characteristic C1 of the columnar member 100 of the present embodiment where soft parts 14b, 16b are provided at the vertical walls 14, 16 and the lengths I of the soft parts 14b, 16b in the direction of the main axis Om are made 0.1 time the heights H of the vertical walls 14, 16, compared with the characteristic C2 of the columnar member 102 of the base member model not provided with the soft parts 14b, 16b at the vertical walls 14, 16, impact energy larger by exactly the amount of the area shown by the hatching is absorbed.

Note that, in the above-mentioned embodiment, a bend inducing part 22 comprised of a recessed bead was shown, but the bend inducing part 22 need only be a portion acting as the starting point of bending of the columnar member 100 and a part with a strength lower than the parts adjoining the bend inducing part 22 at the top plate 12. The bend inducing part 22 may also be comprised of a projecting part, hole, or point of change of curvature of the columnar member 100 provided at the top plate 12. Further, the bend inducing part 22 may also be comprised of a portion where the material strength of the columnar member 100 locally falls.

Figure 19:
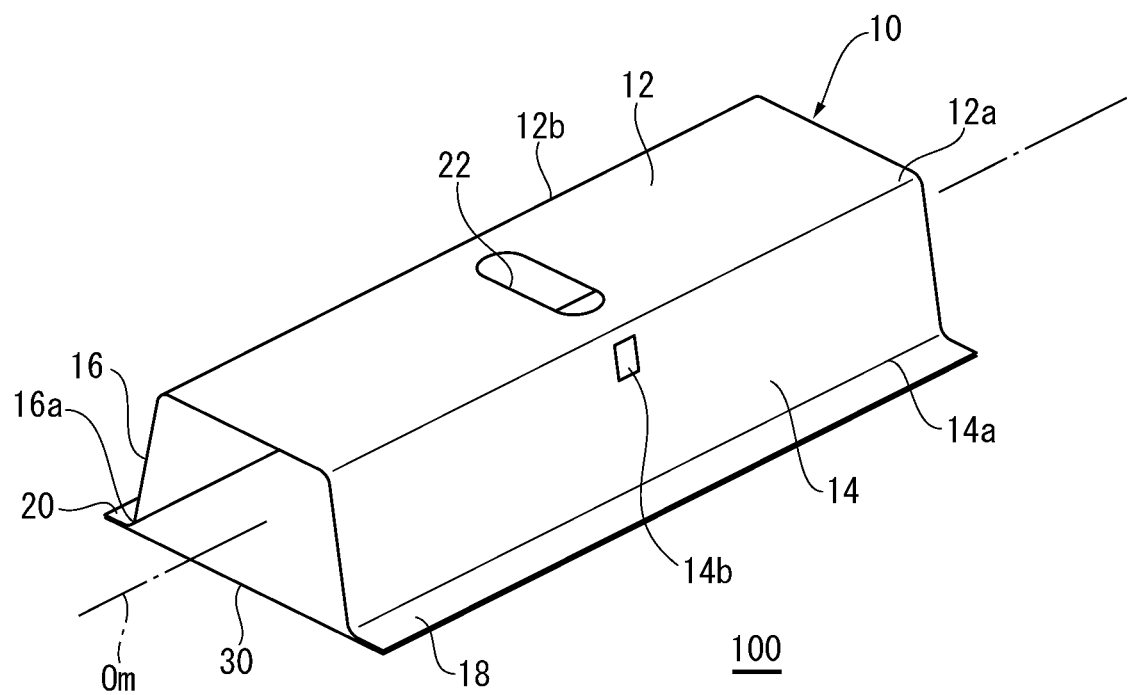
FIG. 19 is a perspective view showing an example where the bend inducing part is comprised of a hole provided at the top plate.
Figure 20:
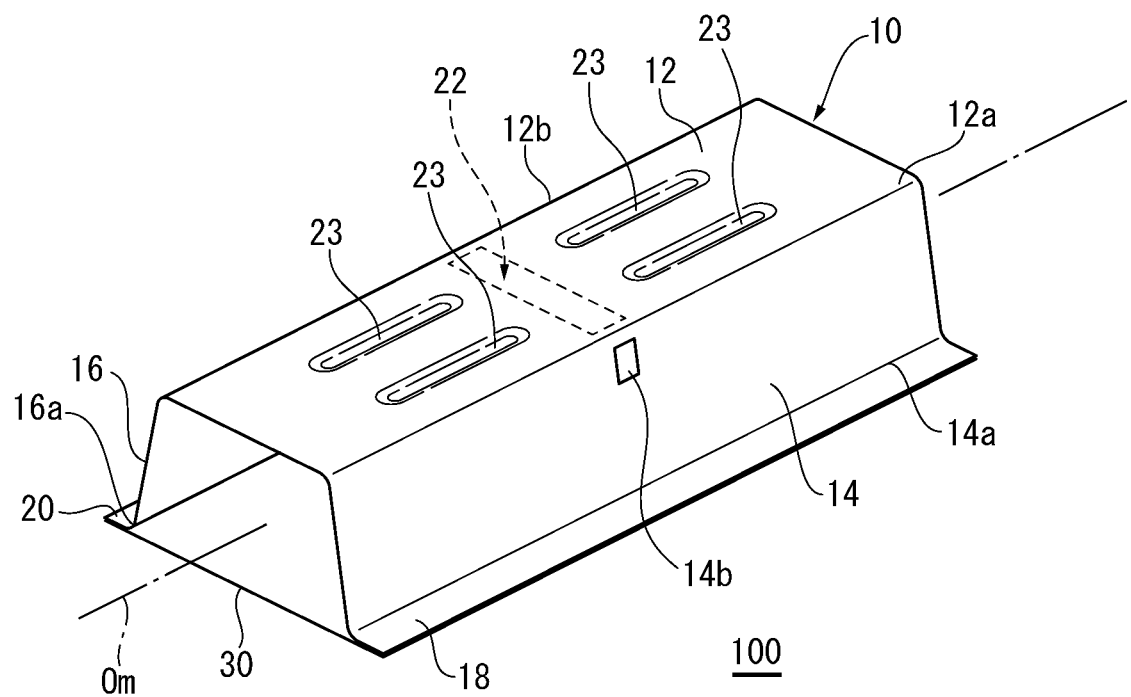
FIG. 20 is a perspective view showing an example where the bend inducing part is comprised of four recessed beads extending in the direction of the main axis.

For example, FIG. 19 is a perspective view showing an example where the bend inducing part 22 is comprised of a hole provided at the top plate 12. Further, FIG. 20 is a perspective view showing an example where the bend inducing part 22 is comprised between four recessed beads 23 extending in the direction of the main axis Om. The bending rigidity of the columnar member 100 is determined by the shape of the cross-section perpendicularly intersecting the main axis Om. Bending deformation easily occurs at the point of change of the cross-sectional secondary moment. In each of the examples of FIG. 19 and FIG. 20, the cross-sectional secondary moment of the cross-section perpendicularly intersecting the main axis Om changes at the position of the bend inducing part 22, so if a compressive load is applied in the direction of the main axis Om of the columnar member 100, the bend inducing part 22 becomes the starting point of the bending.

FIG. 19 is an example where the cross-sectional secondary moment changes to a low at the bend inducing part 22, while FIG. 20 is an example where the cross-sectional secondary moment changes to a high at the recessed beads 23 and as a result the cross-sectional secondary moment changes to a low at the bend inducing part 22. In the example of FIG. 20, the recessed beads 23 provided at the top plate 12 are forms of the reinforcing parts. In the example of FIG. 20, instead of provision of the recessed beads 23 at the top plate 12, it is also possible to join a resin member etc. to the region provided with the beads 23 to obtain reinforcing parts. As shown in FIG. 20, the top plate 12 may have at least two reinforcing parts (beads 23) provided separated from each other in the direction of extension of the columnar member 100, and the bend inducing part 22 may be positioned between reinforcing parts separated in the direction of extension of the columnar member 100.

Figure 22:
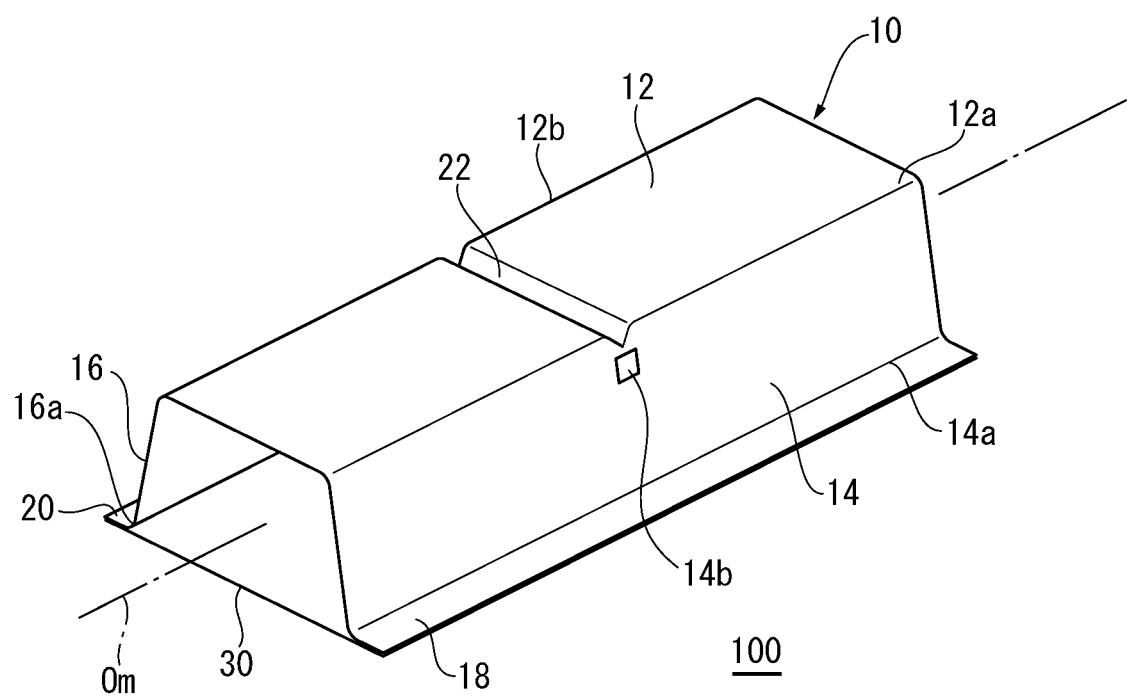
FIG. 22 is a perspective view showing an example where the bend inducing part is comprised of a V-shaped bend inducing bead spanning the two side edges from the top plate.

Further, FIG. 22 is a perspective view showing an example where the bend inducing part 22 is comprised of a V-shaped bend inducing bead formed so as to span the ridge parts of the two side edges 12a, 12b of the top plate 12. As shown in FIG. 22, the bend inducing part 22 is comprised of a region including the top plate 12 and the ridge parts of the two side edges 12a, 12b of the top plate 12.

Figure 23:
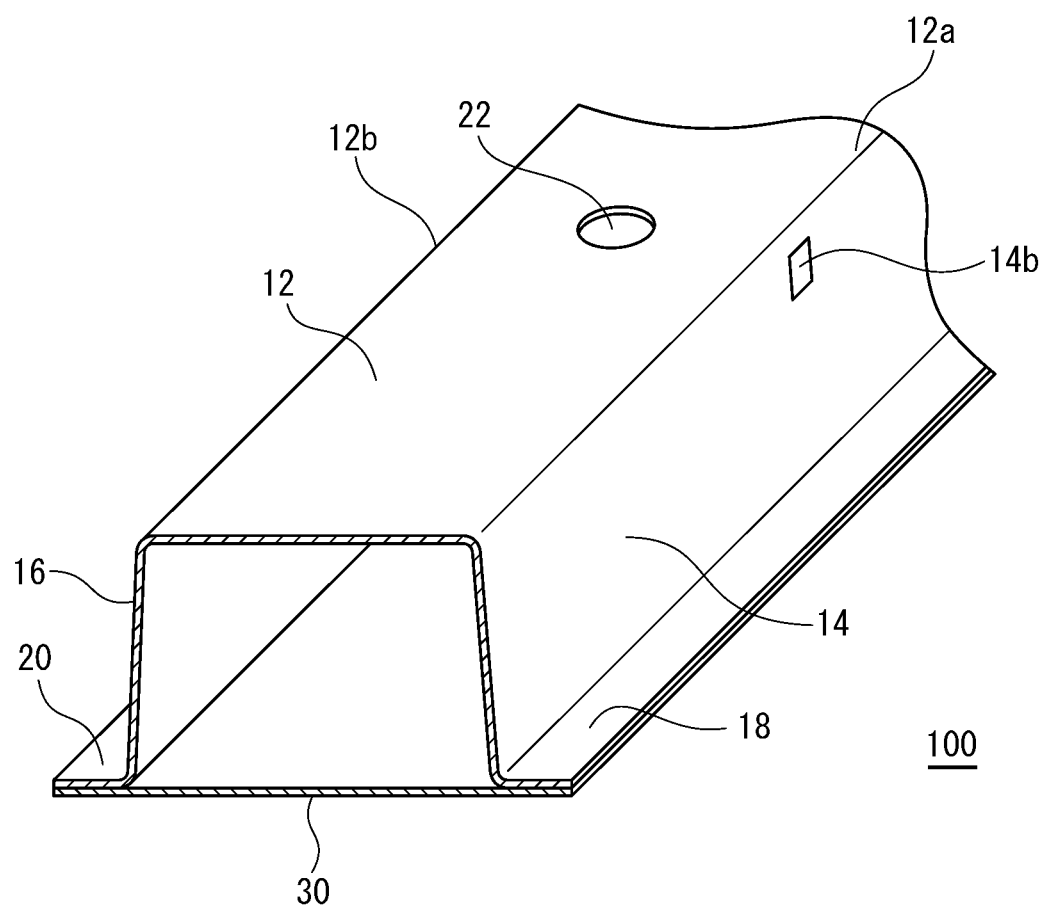
FIG. 23 is a perspective view showing another example of a bend inducing part.
Figure 24:
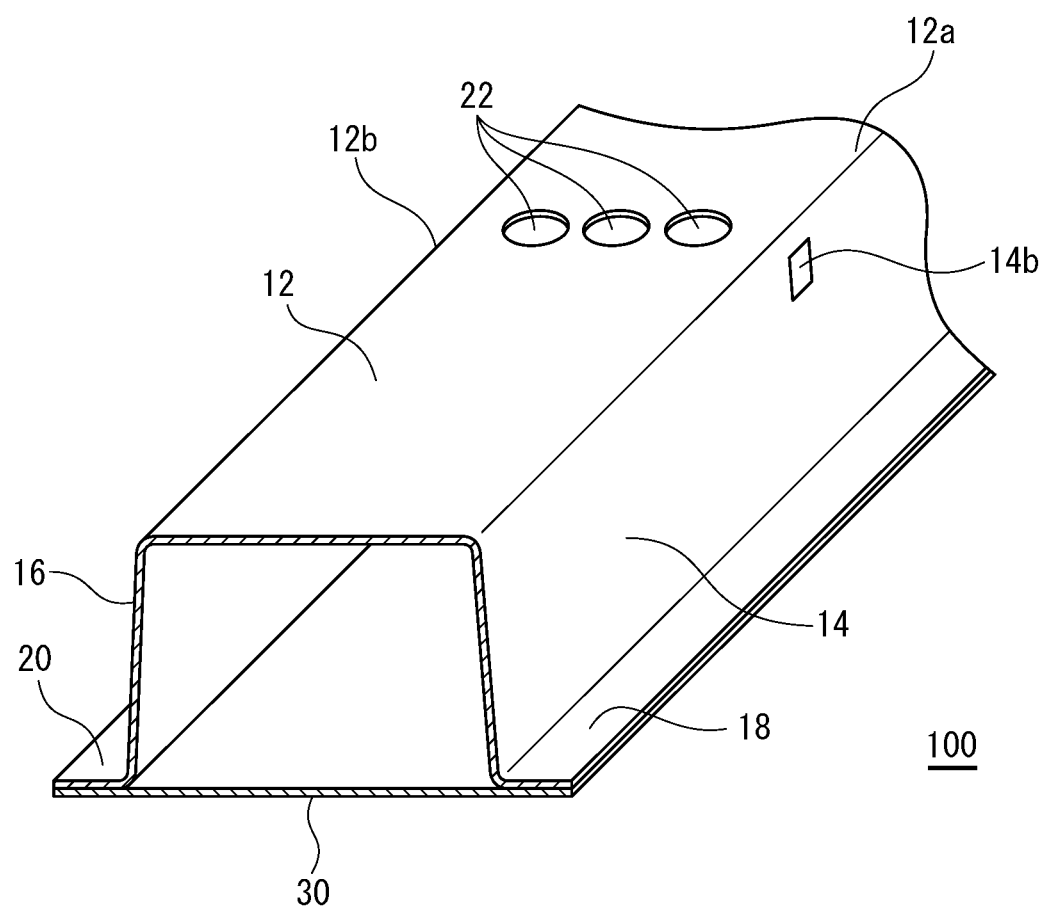
FIG. 24 is a perspective view showing another example of a bend inducing part.
Figure 25:
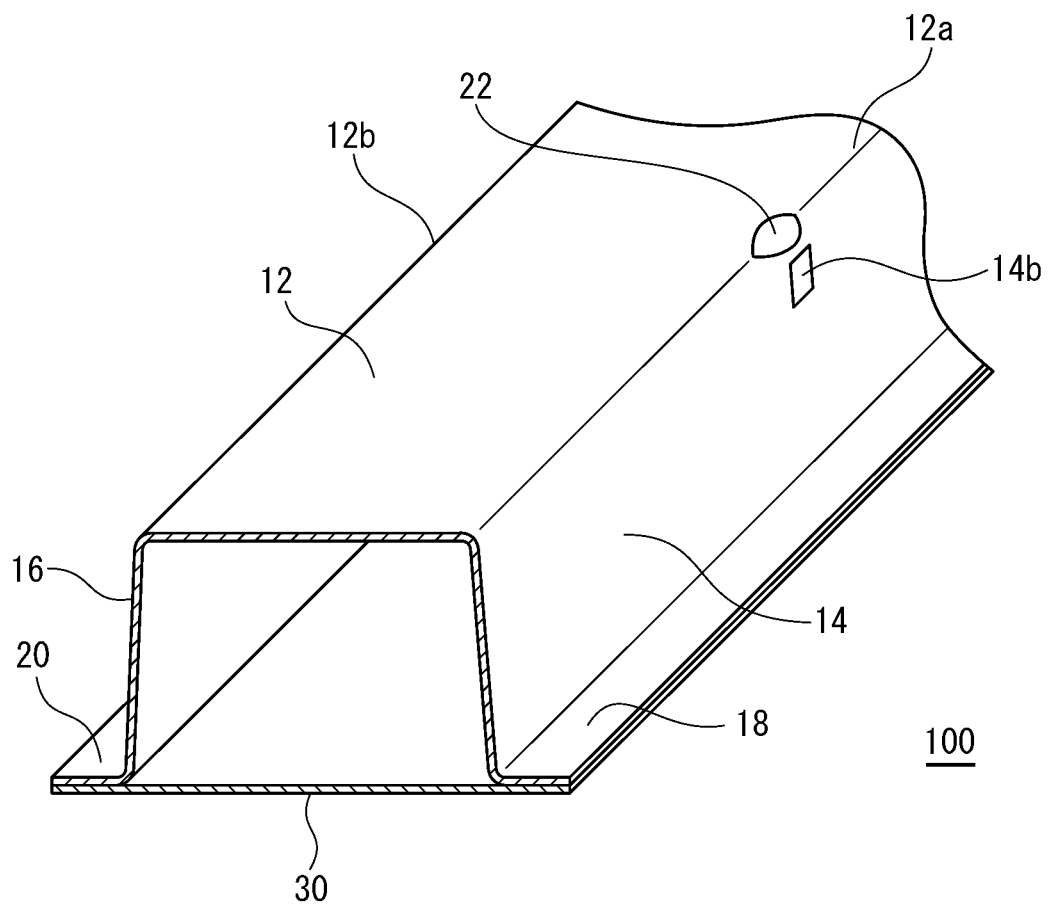
FIG. 25 is a perspective view showing another example of a bend inducing part.
Figure 26:
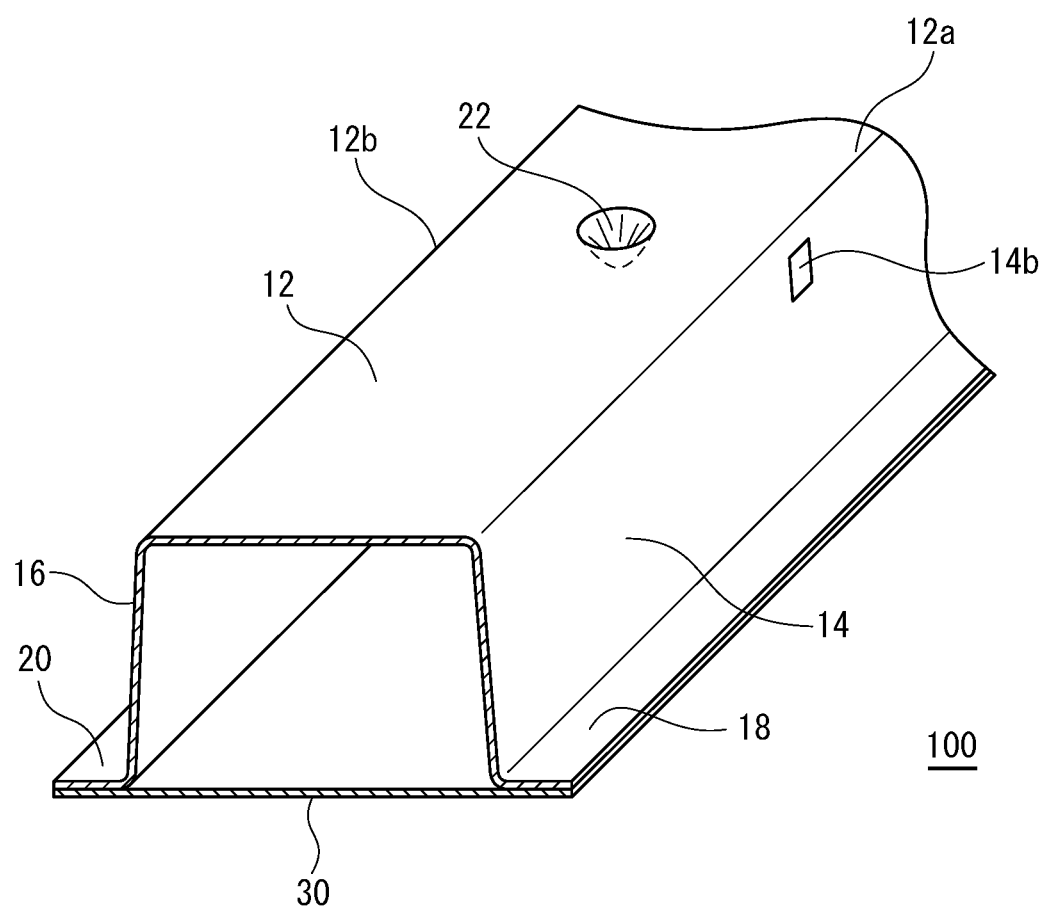
FIG. 26 is a perspective view showing another example of a bend inducing part.
Figure 27:
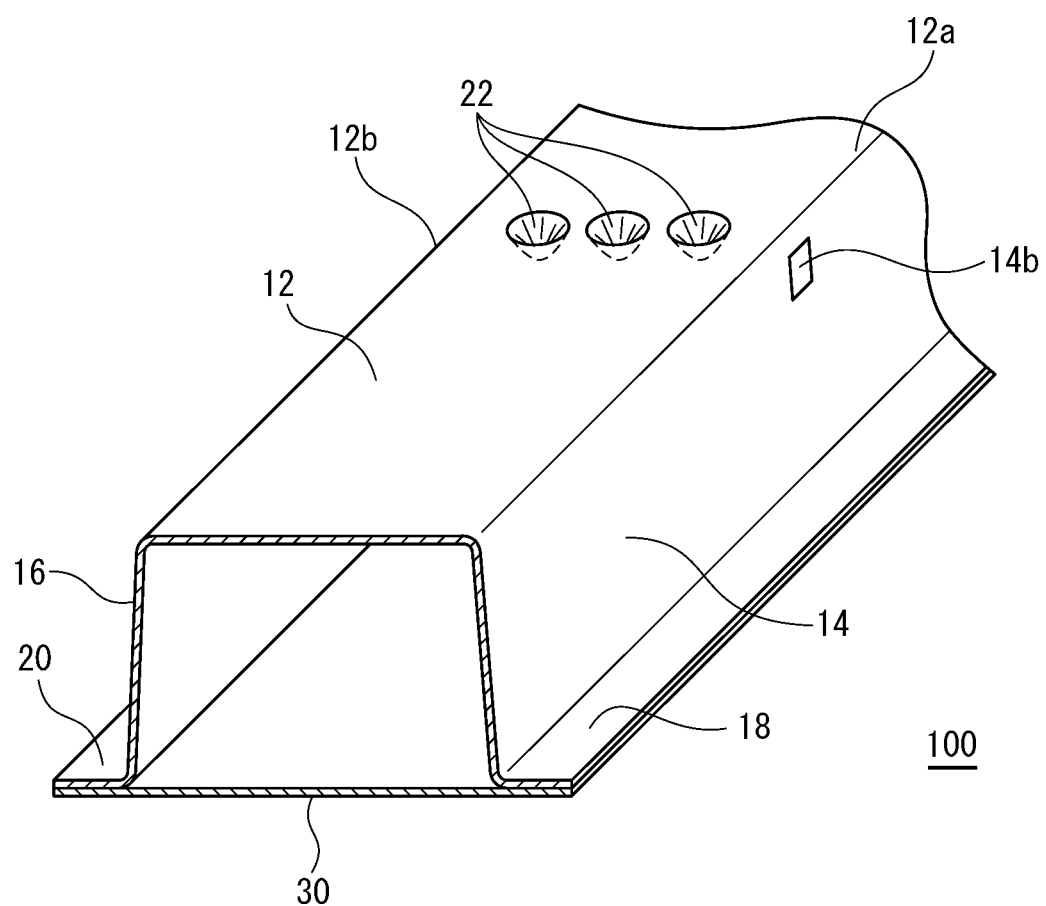
FIG. 27 is a perspective view showing another example of a bend inducing part.
Figure 28:
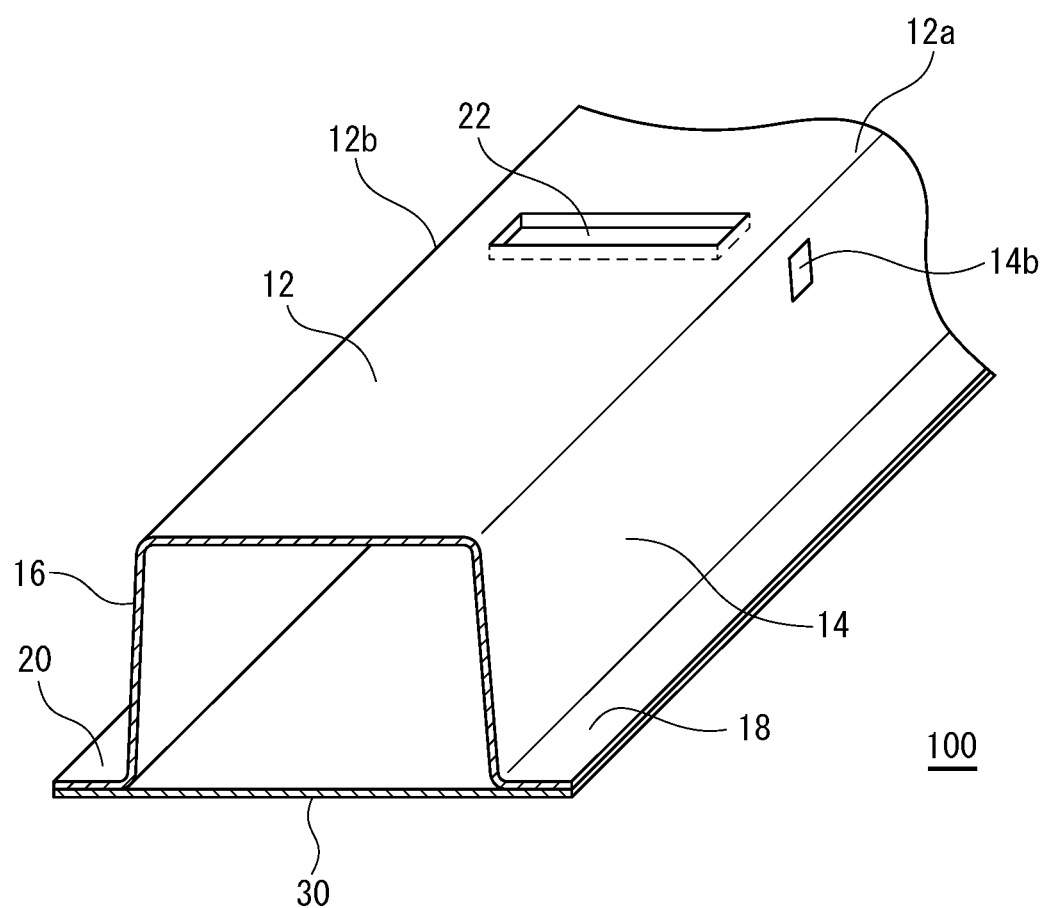
FIG. 28 is a perspective view showing another example of a bend inducing part.
Figure 29:
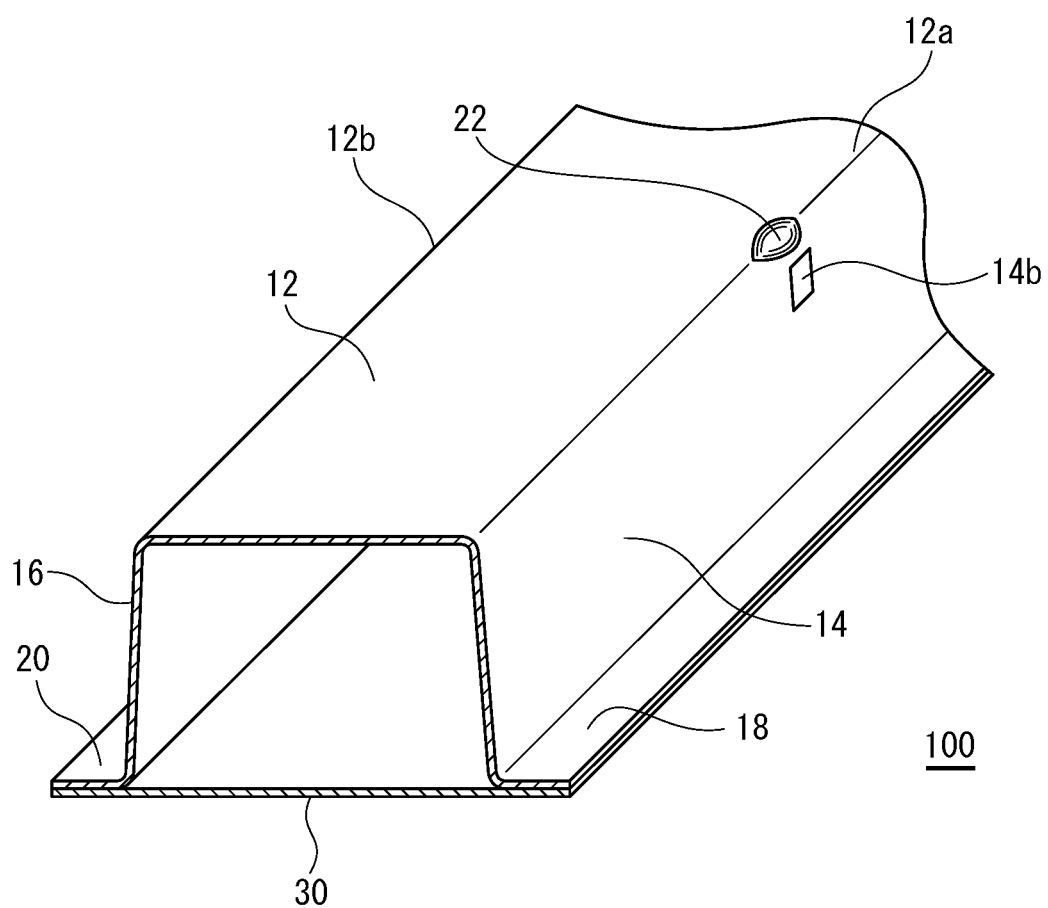
FIG. 29 is a perspective view showing another example of a bend inducing part.
Figure 30:
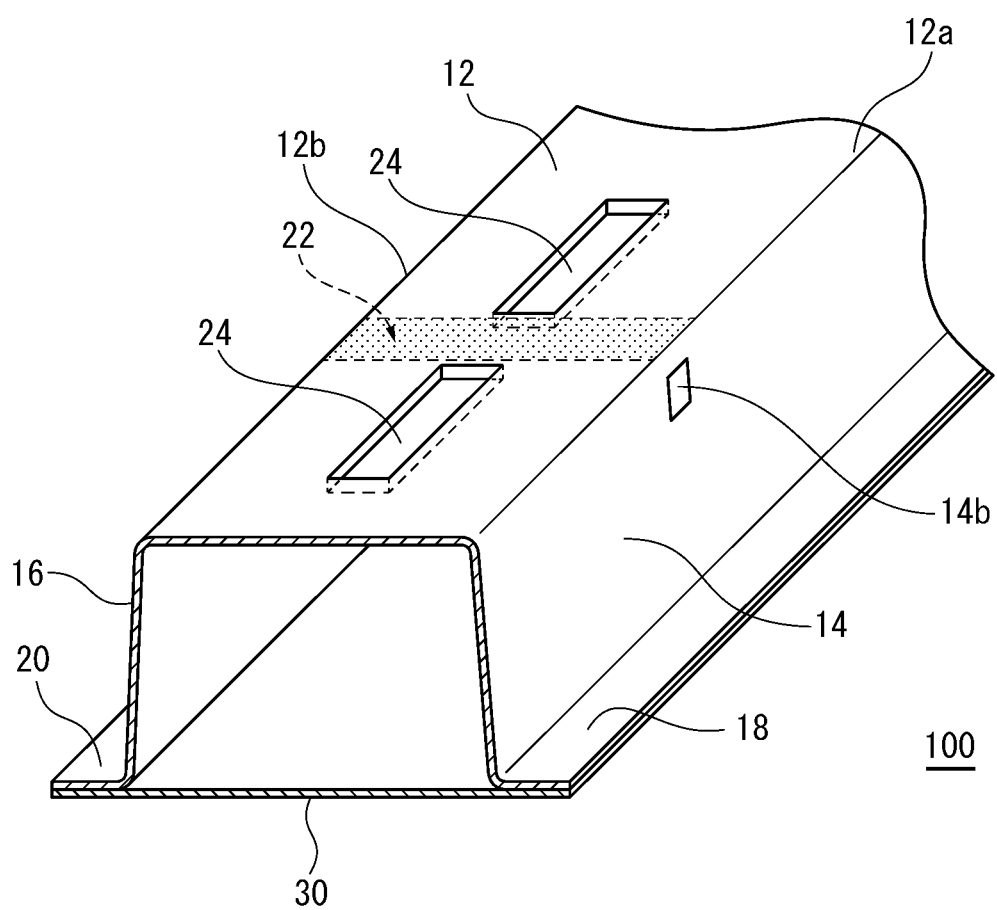
FIG. 30 is a perspective view showing another example of a bend inducing part.
Figure 31:
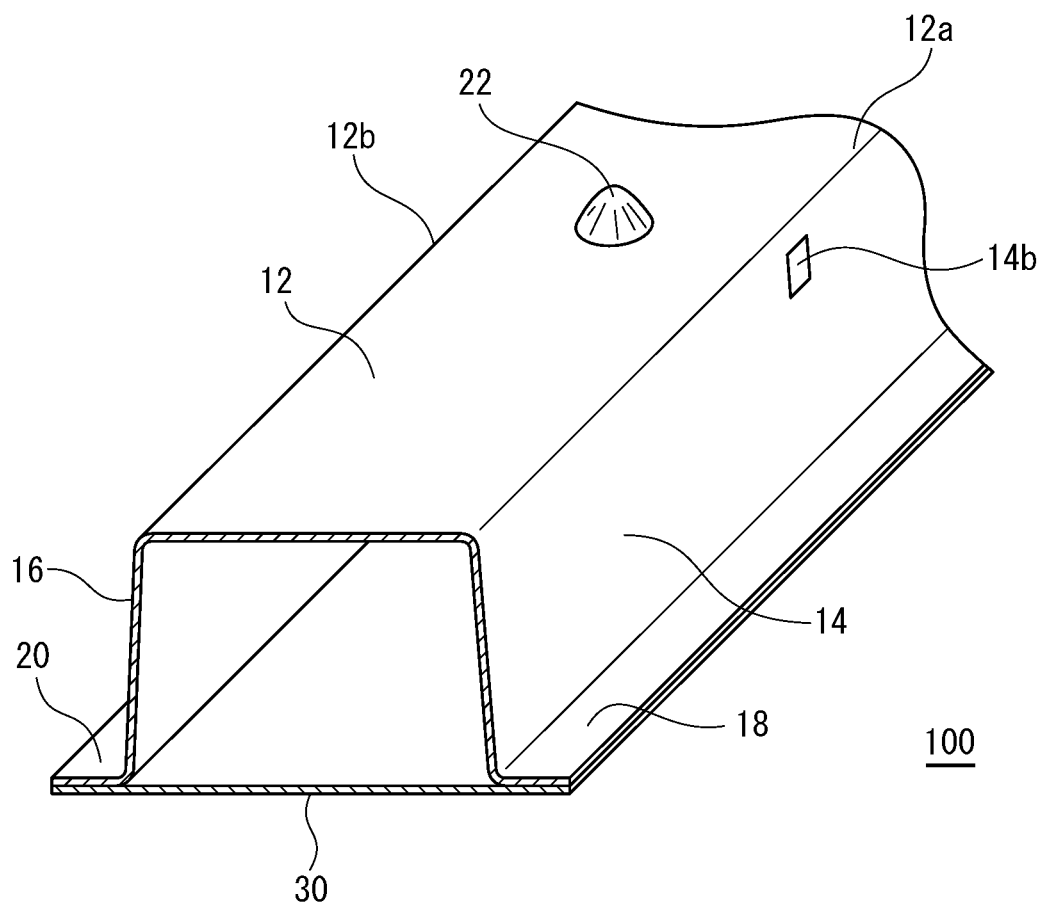
FIG. 31 is a perspective view showing another example of a bend inducing part.
Figure 32:
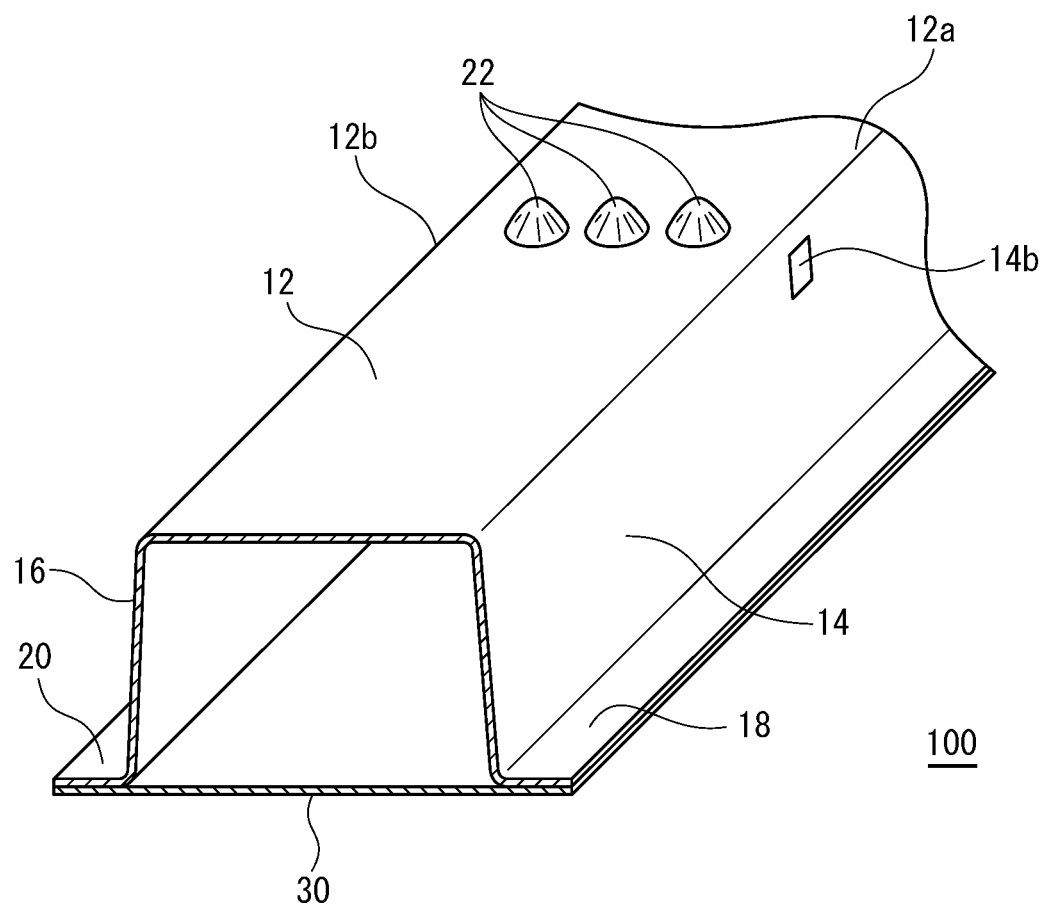
FIG. 32 is a perspective view showing another example of a bend inducing part.
Figure 33:
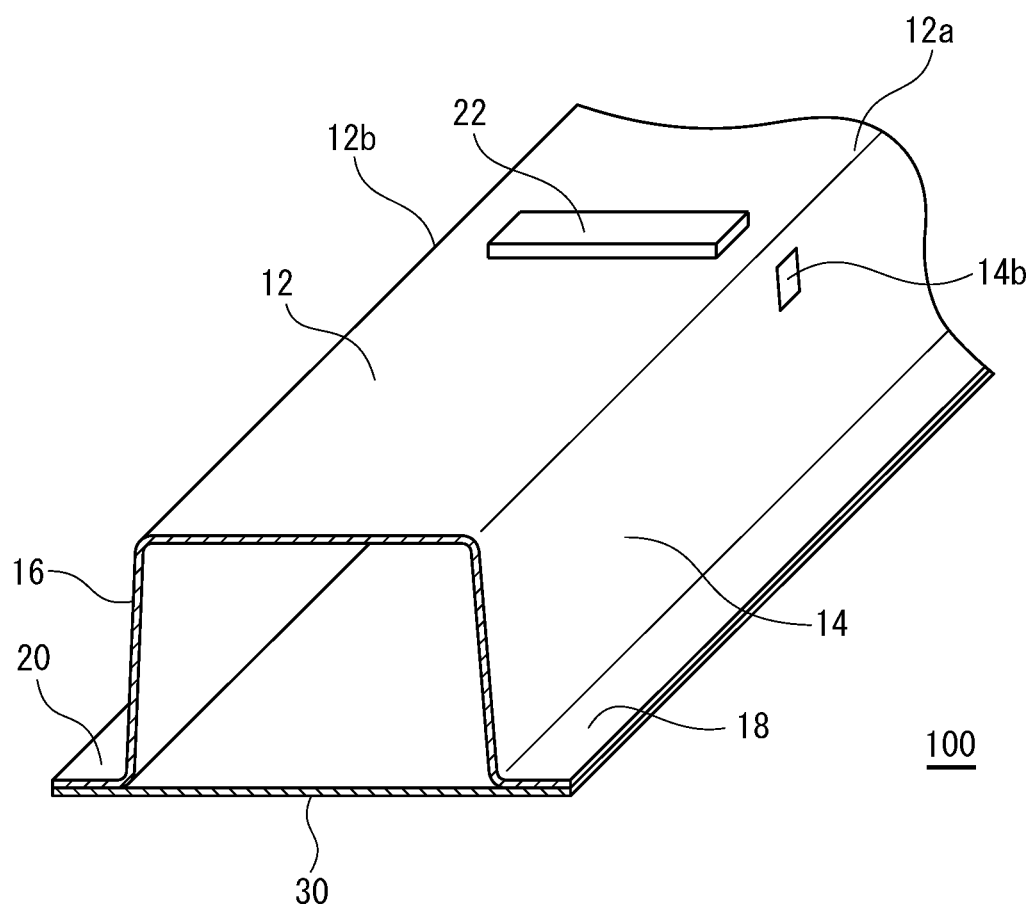
FIG. 33 is a perspective view showing another example of a bend inducing part.
Figure 34:
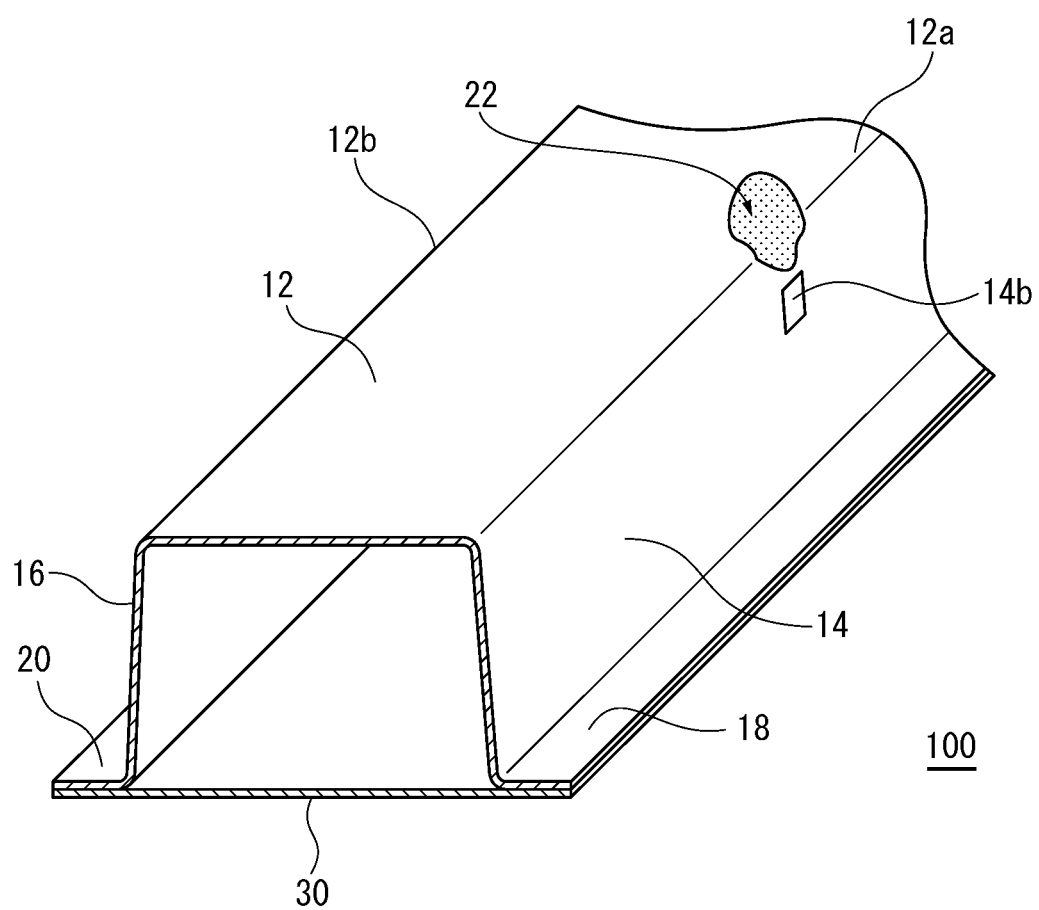
FIG. 34 is a perspective view showing another example of a bend inducing part.

Further, as shown in FIG. 23 to FIG. 40, as the constitution of the bend inducing part 22, the constitutions disclosed in Japanese Unexamined Patent Publication No. 2018-149912 may be applied. FIG. 23 to FIG. 40 are schematic views showing other examples of the bend inducing part 22 provided at the columnar member 100 according to the present embodiment. As shown in FIG. 23, the bend inducing part 22 may be comprised of a circular hole provided at the top plate 12. Further, as shown in FIG. 24, the bend inducing part 22 may also be comprised of a plurality of holes provided at the top plate 12. In this case, for example, the plurality of holes may be provided aligned in a direction perpendicular to the longitudinal direction of the columnar member 100. Further, as shown in FIG. 25, the bend inducing part 22 may be comprised of a hole provided at the ridge part of the side edge 12a or side edge 12b. Further, as shown in FIG. 26, the bend inducing part 22 may be comprised of a circular recessed part provided at the top plate 12. Further, as shown in FIG. 27, the bend inducing part 22 may be comprised of a plurality of circular recessed parts provided at the top plate 12. In this case, for example, the plurality of recessed parts may be provided aligned in a direction perpendicular to the longitudinal direction of the columnar member 100. Further, as shown in FIG. 28, the bend inducing part 22 may be comprised of a rounded edge rectangular shaped bead (recessed part) extending in a direction perpendicular to the longitudinal direction of the columnar member 100. Further, as shown in FIG. 29, the bend inducing part 22 may be comprised of a recessed part provided at the ridge part of the side edge 12a or the side edge 12b. Further, as shown in FIG. 30, two rectangular shape recessed parts 24 extending along the longitudinal direction of the columnar member 100 may be provided and the bend inducing part 22 may be comprised between the two recessed parts 24. Note that, in the example of FIG. 30, the recessed parts 24 are forms of the reinforcing parts. Further, as shown in FIG. 31, the bend inducing part 22 may be comprised of a circular projecting part provided at the top plate 12. Further, as shown in FIG. 32, the bend inducing part 22 may be comprised of a plurality of projecting parts provided at the top plate 12. In this case, for example, the plurality of projecting parts may be provided aligned in a direction perpendicular to the longitudinal direction of the columnar member 100. Further, as shown in FIG. 33, the bend inducing part 22 may be comprised of a projecting part provided at the top plate 12 and extending in a direction perpendicular to the longitudinal direction of the columnar member 100. Further, as shown in FIG. 34, the bend inducing part 22 may be comprised of a projecting part provided at the ridge part of the side edge 12a or the side edge 12b. Further, as shown in FIG. 35, two projecting parts 26 extending along the longitudinal direction of the columnar member 100 may be provided and the bend inducing part 22 may be comprised between the two projecting parts 26.

Figure 35:
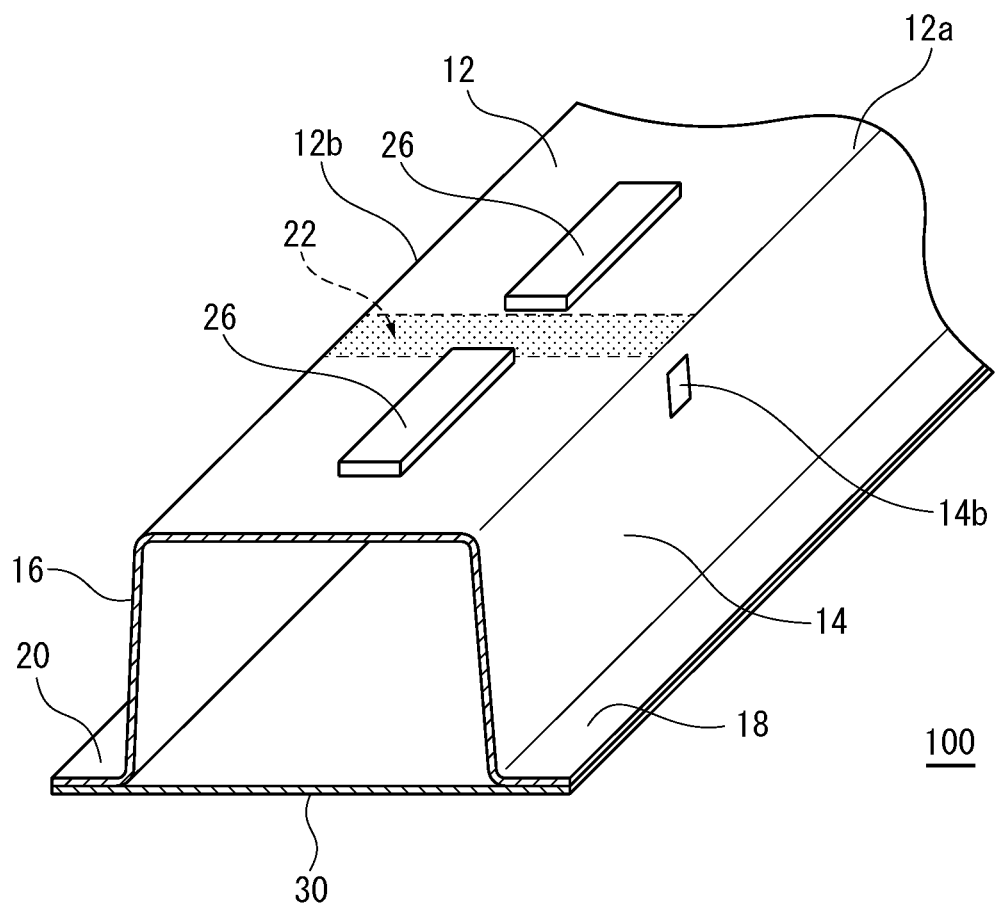
FIG. 35 is a perspective view showing another example of a bend inducing part.
Figure 36:
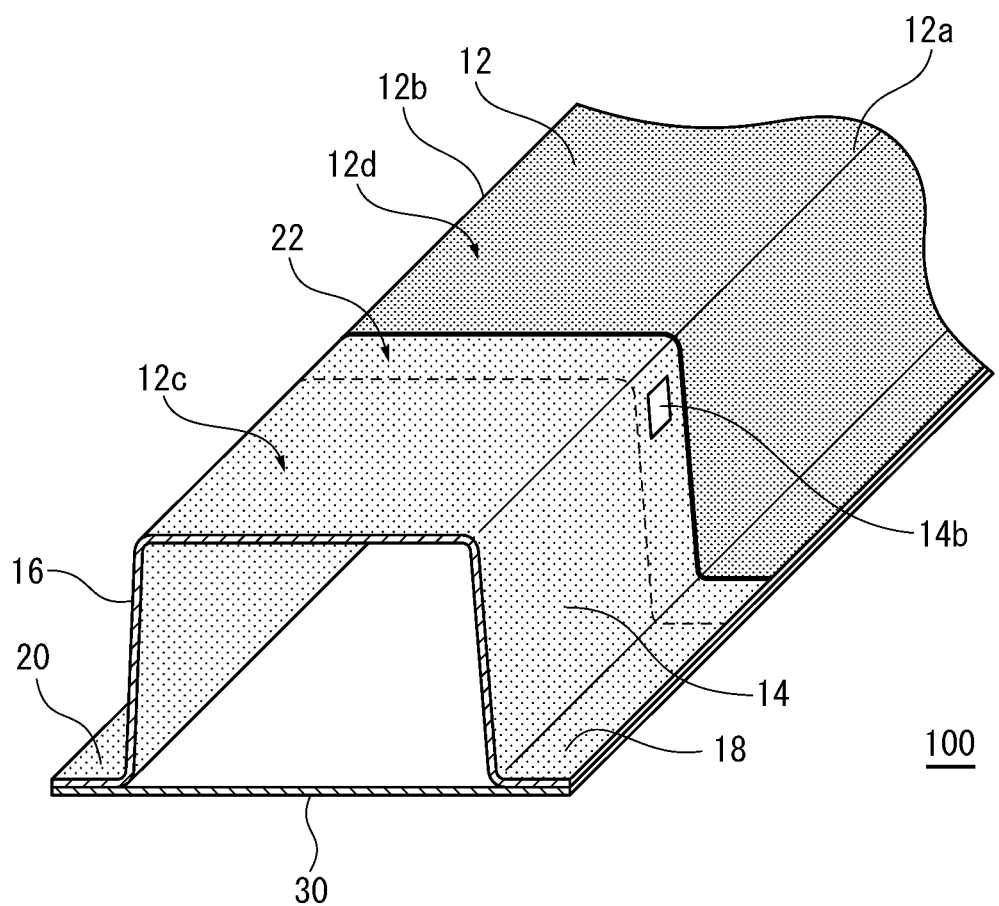
FIG. 36 is a perspective view showing another example of a bend inducing part.
Figure 37:
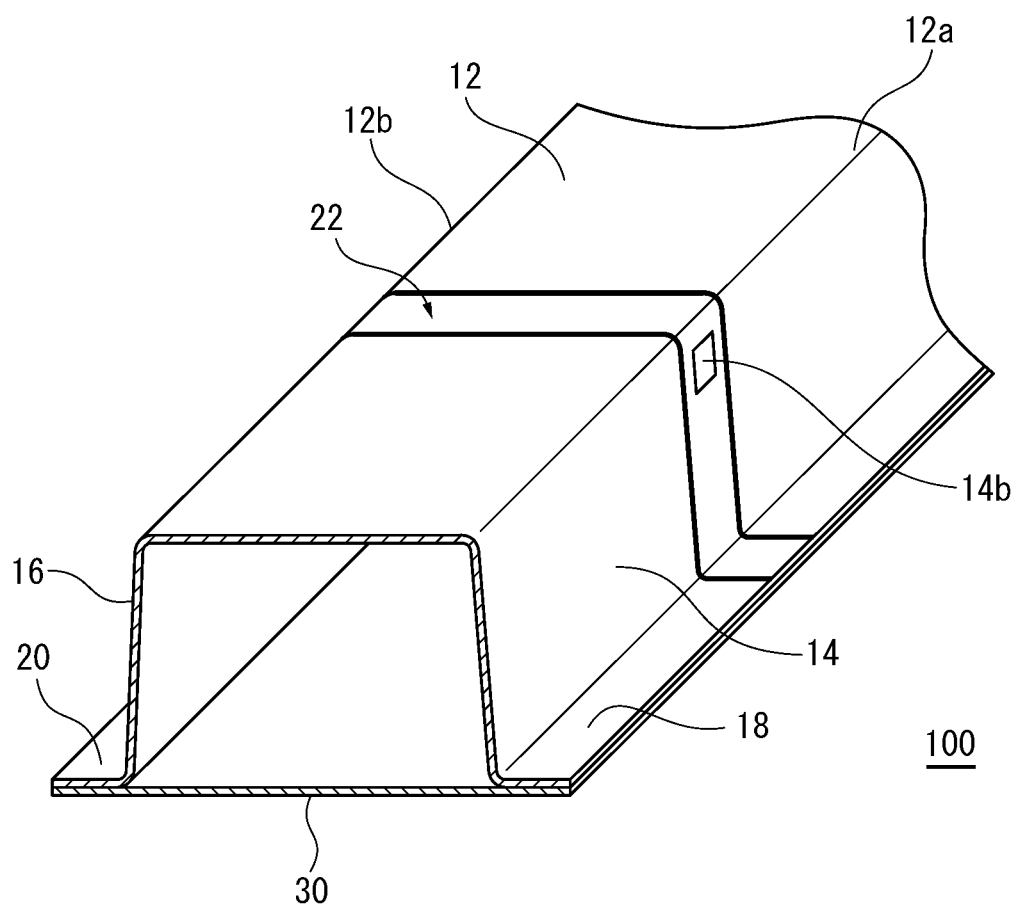
FIG. 37 is a perspective view showing another example of a bend inducing part.
Figure 38:
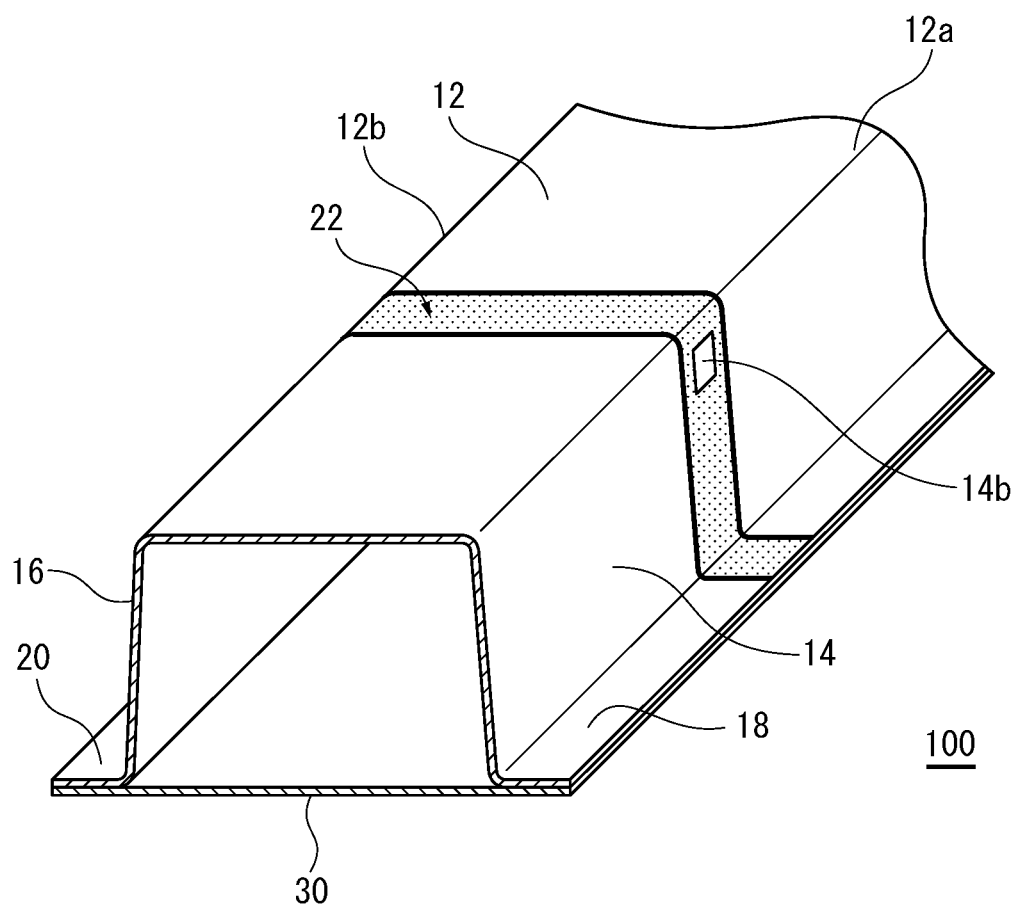
FIG. 38 is a perspective view showing another example of a bend inducing part.
Figure 39:
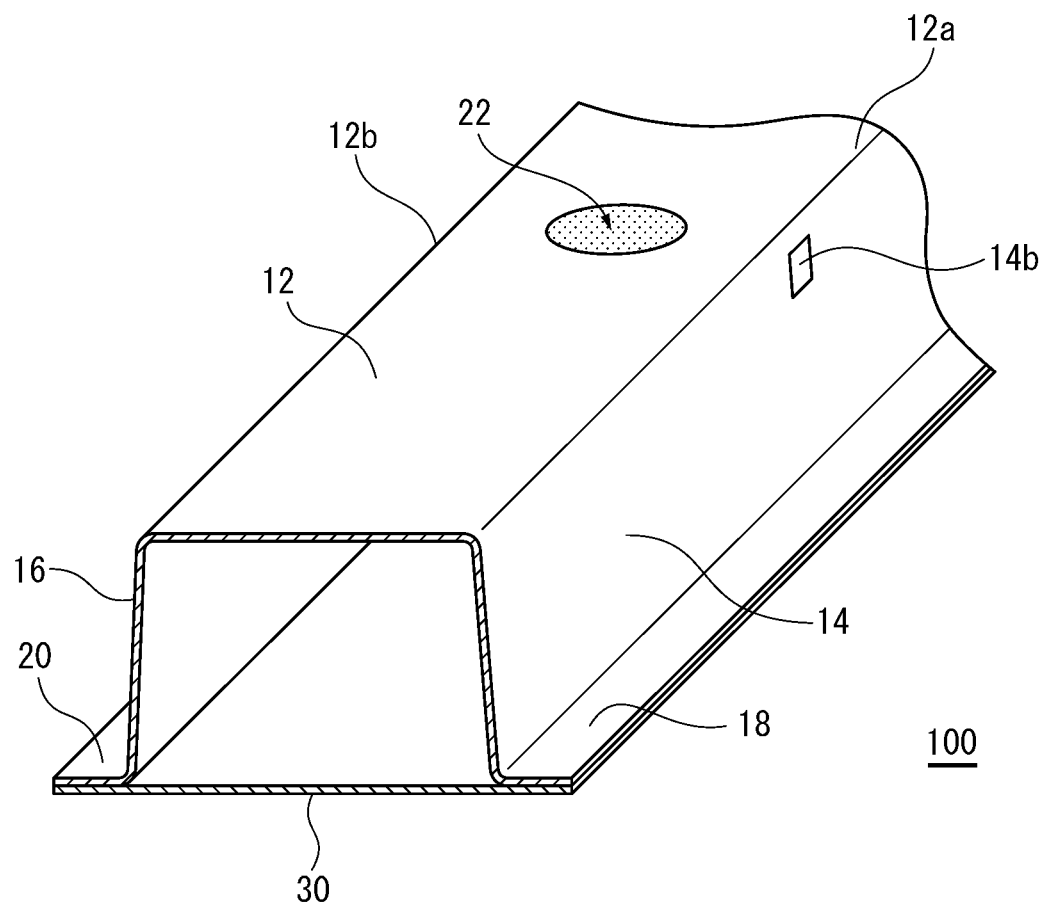
FIG. 39 is a perspective view showing another example of a bend inducing part.
Figure 40:
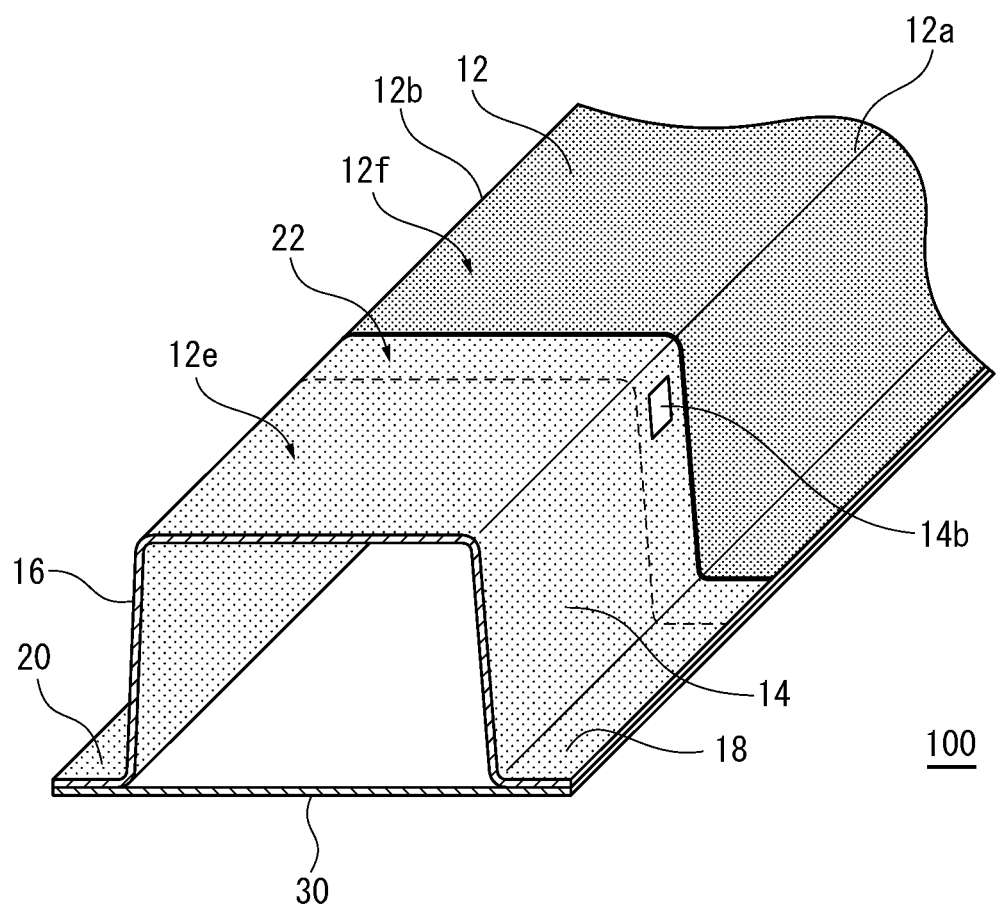
FIG. 40 is a perspective view showing another example of a bend inducing part.

Note that, in the example of FIG. 35, the projecting parts 26 are forms of the reinforcing parts. Further, as shown in FIG. 36, the hat shape member 10 of the columnar member 100 may be provided with a first sheet thickness part 12c and a second sheet thickness part 12d, the thickness of the steel sheet may differ between the first sheet thickness part 12c and the second sheet thickness part 12d, and the bend inducing part 22 may be a part at the thin side of the sheet thickness at the boundary of the first sheet thickness part 12c and the second sheet thickness part 12d (part between boundary and broken line shown in FIG. 36). Note that, the first sheet thickness part 12c is thinner in sheet thickness than the second sheet thickness part 12d. Further, as shown in FIG. 37, in the direction along the circumferential direction of the hat shape member 10, a thin part relatively thinner in sheet thickness than other parts may be provided and the bend inducing part 22 may be comprised of this thin part. Further, as shown in FIG. 38, the bend inducing part 22 may also be comprised of a different strength part having a yield strength different from (yield strength lower than) other parts of the hat shape member 10 and provided along the circumferential direction of the hat shape member 10. Further, as shown in FIG. 39, a bend inducing part 22 comprised of a different strength part may also be partially provided at the top plate 12. Further, as shown in FIG. 40, the hat shape member 10 of the columnar member 100 may be provided with a first strength part 12e and second strength part 12f, the yield strength of the steel sheet may differ between the first strength part 12e and second strength part 12f, and the bend inducing part 22 may be the part at the low strength side at the boundary of the first strength part 12e and the second strength part 12f (part between boundary and broken line shown in FIG. 40). Note that, the first strength part 12e is a part with a strength lower than the second strength part 12f.

Further, in the above-mentioned embodiment, the example where the bend inducing part 22 was provided at the top plate 12 was shown, but the bend inducing part 22 may also be provided at the plate-shaped member 30 at the opposite side of the top plate 12.

Figure 21:
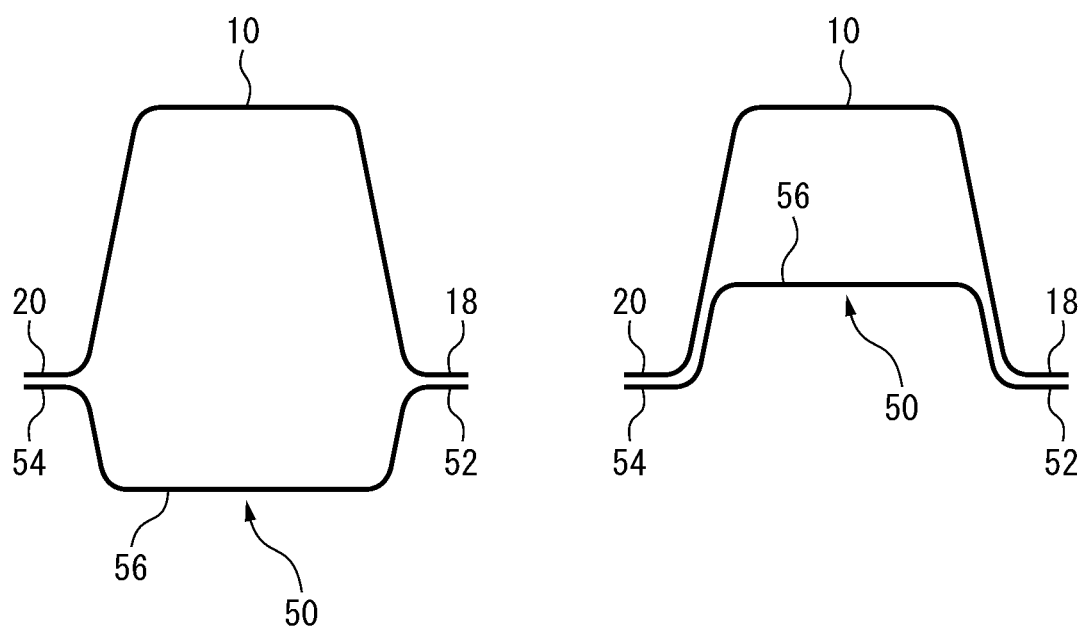
FIG. 21 is a schematic view showing an example where the columnar member is comprised of two hat shape members and a schematic view showing a cross-section along a direction perpendicular to the direction of the main axis of the columnar member.

Further, in the above-mentioned embodiment, the example where the columnar member 100 was comprised of the hat shape member 10 and plate-shaped member 30 was shown, but the columnar member 100 may also be comprised of two hat shape members. FIG. 21 is a schematic view showing an example where the columnar member 100 is comprised of a hat shape member 10 and hat shape member 50 and a schematic view showing a cross-section along a direction perpendicular to the direction of the main axis Om of the columnar member 100. In the columnar member 100 shown in FIG. 21, the flange parts 52, 54 of the hat shape member 50 are joined to the flange parts 18, 20 of the hat shape member 10 by spot welding, line welding, etc. The top plate 56 of the hat shape member 50 may be positioned at the hat shape member 10 side and may be positioned at the opposite side from the hat shape member 10. Note that, FIG. 21 shows a cross-section of the position where no recessed part or hole etc. corresponding to the bend inducing part 22 is provided at the direction of the main axis Om.

As explained above, according to the present embodiment, by providing the soft parts 14b, 16b at the vertical walls 14 at the position of the bend inducing part 22 and making the lengths I of the soft parts 14b, 16b in the direction along the main axis Om 0.01 time to 0.15 time the heights H of the vertical walls 14, 16, the drop in reaction force due to bending deformation when a compressive load is applied to the columnar member 100 is suppressed. Due to this, the impact absorption performance of the columnar member 100 is improved without causing an increase in weight.

EXAMPLES

Below, specific examples of the present embodiment will be explained.

The columnar member 100 was made a structure comprised of a hat shape member 10 including a bend inducing part 22 and soft parts 14b, 16b and a plate-shaped member 30 spot welded at flange parts 18, 20. The hat shape member 10 was comprised of a steel sheet with a tensile strength of the 1180 MPa class and a sheet thickness of 1.6 mm, while the plate-shaped member 30 was comprised of a steel sheet with a tensile strength of the 980 MPa class and a sheet thickness of 1.2 mm.

The spot welding pitch was made 30 mm while the weld diameter of the spot welding was made 6 mm. Further, the member length (L1 shown in FIG. 6A) was made 340 mm, the height of the hat shape member 10 (H shown in FIG. 4) was made 72 mm, and the width of the plate-shaped member 30 (W shown in FIG. 4) was made 160 mm. This was made common for all of the columnar members 100 and the columnar member 102 of the base member model.

As a result of intensive studies of the inventors, it was learned that the reaction force and amount of energy absorption differ from the base member model depending on the shape (aspect ratio) and strength ratio of the soft parts 14b, 16b.

Figure 12:
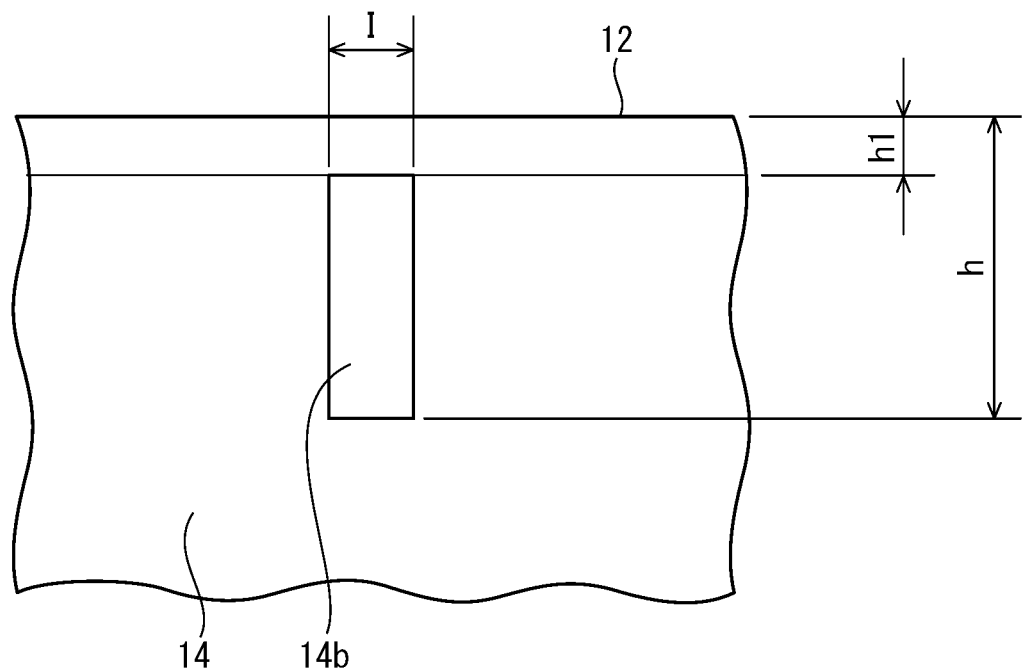
FIG. 12 is a schematic view showing in detail a soft part provided at a vertical wall.
Figure 13:
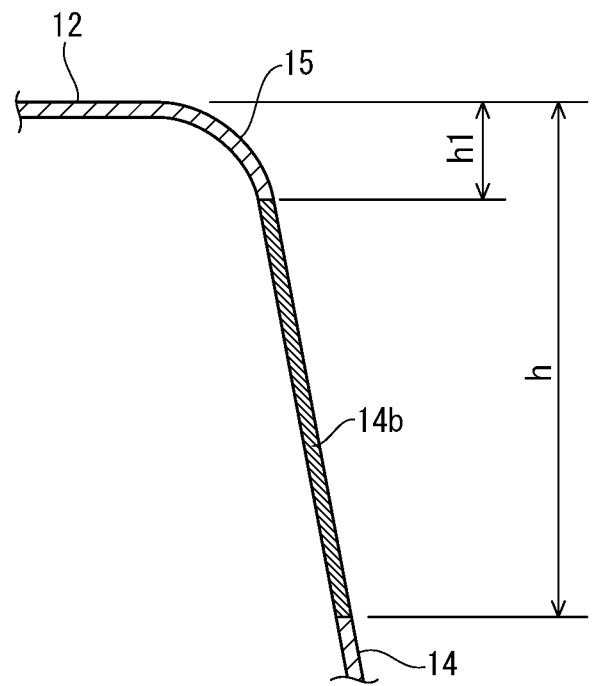
FIG. 13 is a cross-sectional view showing enlarged a vicinity of the soft part in FIG. 3.

FIG. 12 is a schematic view showing in detail a soft part 14b provided at the vertical wall 14. Further, FIG. 13 is a cross-sectional view showing enlarged a vicinity of the soft part 14b in FIG. 3. In FIG. 12 and FIG. 13, h1 shows the distance from the surface of the top plate 12 to the bottom end of the ridge part (bent arc part) 15 at the boundary of the top plate 12 and the vertical walls 14, 16. The end parts of the soft parts 14b, 16b at the top plate 12 side (top ends of soft parts 14b, 16b) are positioned at the end parts of the ridge parts 15 connecting the top plate 12 and the vertical walls 14, 16 (ridge parts 15 at distance of h1 from top plate 12). As shown in FIG. 12, the shapes of the soft parts 14b, 16b are determined by the lengths I (mm) and heights "h" (mm) in the direction of the main axis Om. Note that, the bottom ends of the ridge parts 15 correspond to the top edge parts of the vertical walls 14, 16.

Relationship of Shapes of Soft Parts and Reaction Force

First, the results of study of the relationship of variations of the shapes of the soft parts 14b, 16b corresponding to the lengths I and heights "h" and the reaction force will be shown. A comparison of the reaction force of a columnar member 100 provided with the soft parts 14b, 16b with a columnar member 102 of a base member model formed with the bend inducing part 22 at the center of the web surface in the longitudinal direction such as shown in FIG. 5 was performed by CAE.

In the study of the reaction force, a plurality of variations were prepared for the lengths I (mm) of the soft parts 14b, 16b in the direction of the main axis Om shown in FIG. 12 and the heights "h" (mm) of the soft parts 14b, 16b and a characteristic showing the relationship between the stroke and reaction force similar to FIG. 9 was obtained for each variation of sizes of the soft part 14b, 16b.

At this time, in the same way as FIG. 6A, the deformation in the case of making shafts inserted into holes 42 of the tools 40 at the two ends of the columnar member 100 approach each other was analyzed. In FIG. 6A, shafts running along the width direction of the columnar member 100 were inserted in holes 42 provided at positions of L2=67 mm from the end parts in the longitudinal direction of the columnar member 100 and L3=15 mm from the top plate 12 in the height direction and these shafts were made to approach each other at 500 min/s speed to impart forced displacement and analyze bending deformation of the columnar members 100, 102.

Figure 14:
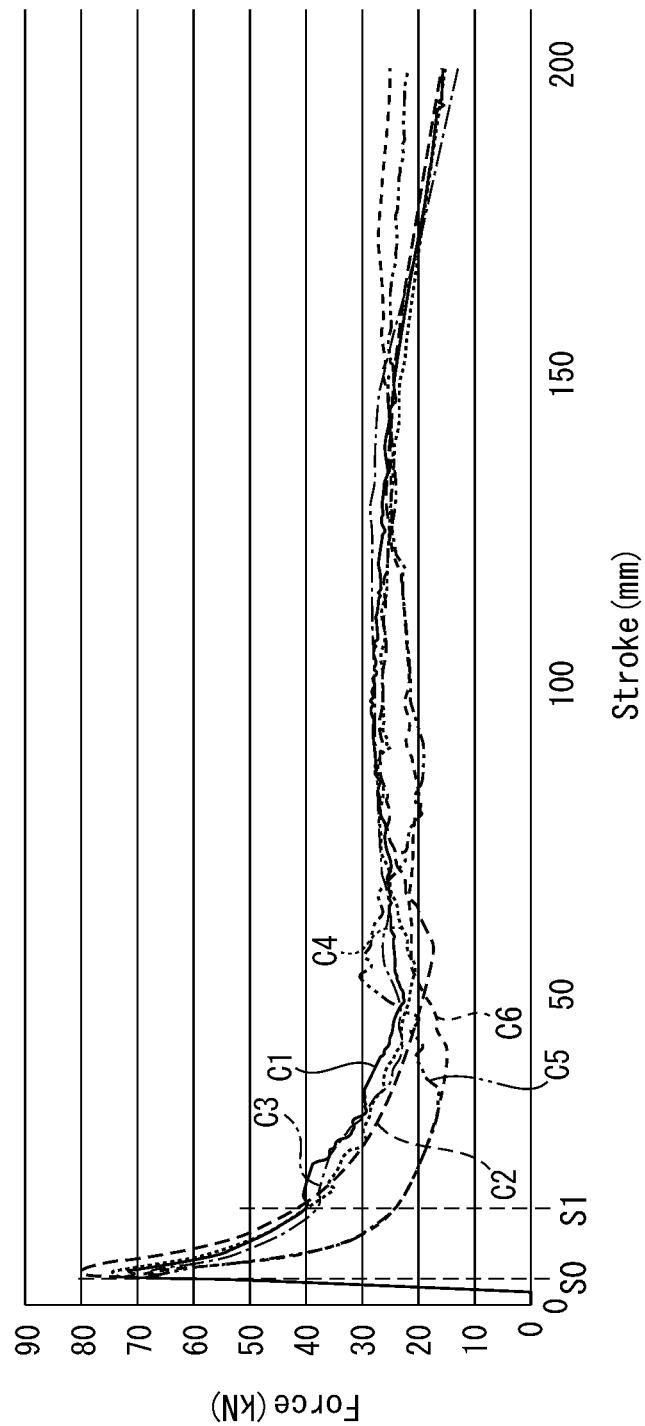
FIG. 14 is a graph showing a relationship between a stroke and reaction force for every variation of shape of the soft part.

FIG. 14 is a graph showing a relationship between a stroke and reaction force for every variation of shape of the soft parts 14b, 16b. As variations of shapes of the soft parts 14b, 16b, several shapes with different lengths I (mm) in the direction of the main axis Om and height "h" (mm) were prepared and measured for the characteristics C1 to C6 of the stroke and reaction force shown in FIG. 14. In the characteristics C1 to C6, the ratios of the lengths I (mm) and heights "h" (mm) to the height H are as shown in the following Table 1. Note that, the characteristic C1 and the characteristic C2 shown in FIG. 14 are the same as the characteristic C1 and the characteristic C2 shown in FIG. 9. In the columnar members 100 provided with the soft parts 14b, 16b, members with a higher reaction force than the columnar member 102 of the base member model in the process of drop of the reaction force were designated as invention examples and members with a lower reaction force than the columnar member 102 of the base member model were designated as comparative examples.

TABLE 1

| Characteristic | I/H | h/H | Strength ratio | Remarks |
| --- | --- | --- | --- | --- |
| C1 | 0.1 | 0.33 | 0.2 | Inv. ex. |
| C2 | No soft parts (base member model) | No soft parts (base member model) | | Comp. ex. |
| C3 | 0.33 | 0.90 | 0.2 | Inv. ex. |
| C4 | 0.33 | 0.20 | 0.2 | Inv. ex. |
| C5 | 0.4 | 0.33 | 0.2 | Comp. ex. |
| C6 | 0.4 | 0.20 | 0.2 | Comp. ex. |

As shown in FIG. 14, in the comparison with the base member model (the characteristic C2), right after the occurrence of initial collision, the reaction force of the characteristic C1 was the largest, then the reaction force was larger in order of the characteristic C3 and the characteristic C4. From the results, if I/H is 0.1 or more and 0.33 or less, it is learned that the drop in the reaction force can be suppressed without regard as to the heights "h" (mm) of the soft parts 14b, 16b. Further, if I/H is 0.4, the lengths I in the direction of the main axis Om are not made 0.01 time to 0.15 time the heights H of the vertical walls 14, 16, so if applying a compressive load, the soft parts 14b, 16b easily deform and the reaction force became lower than the base member model from right after the stroke S0.

Relationship of Strength of Soft Part and Reaction Force

Figure 15:
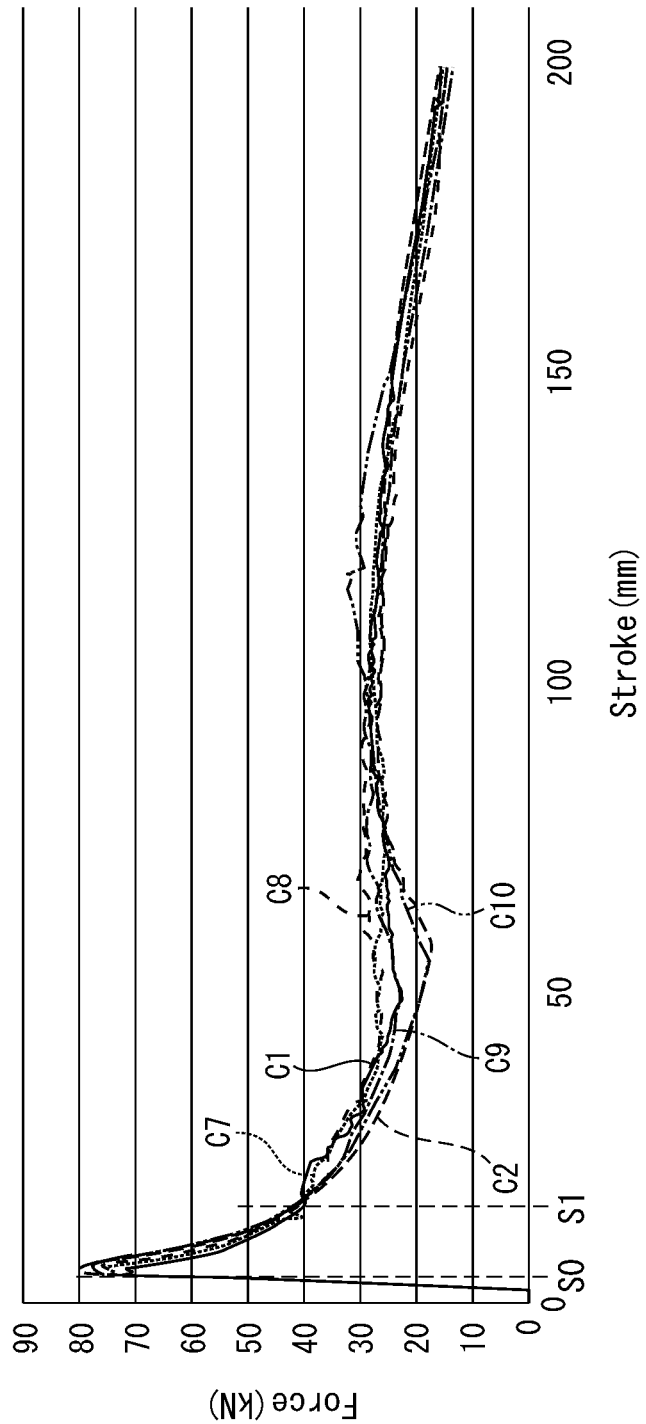
FIG. 15 is a graph showing a relationship between a stroke and reaction force for every variation of strength of the soft part.

Next, the results of study of the relationship of the variations of strengths of the soft parts 14b, 16b and the reaction force will be shown. FIG. 15 is a graph showing a relationship between a stroke and reaction force for every variation of strength of the soft parts 14b, 16b. As shown in the following Table 2, the values of I/H and h/H were respectively made fixed values of 0.10 and 0.33, the ratios of the yield strength of the soft parts 14b, 16b with respect to the yield strength of the base member other than the soft parts 14b, 16b were made 0.2, 0.4, 0.6, 0.8, and 0.9, and forced displacement was given to columnar members 100 under the same conditions as the above. In the columnar members 100 provided with the soft parts 14b, 16b, members with a higher reaction force than the columnar member 102 of the base member model in the process of drop of the reaction force were designated as invention examples and members with a lower reaction force than the columnar member 102 of the base member model were designated as comparative examples.

TABLE 2

| Characteristic | I/H | h/H | Strength ratio | Remarks |
| --- | --- | --- | --- | --- |
| C1 | 0.10 | 0.33 | 0.2 | Inv. ex. |
| C2 | No soft parts (base member model) | No soft parts (base member model) | | Comp. ex. |
| C7 | 0.10 | 0.33 | 0.4 | Inv. ex. |
| C8 | 0.10 | 0.33 | 0.6 | Inv. ex. |
| C9 | 0.10 | 0.33 | 0.8 | Inv. ex. |
| C10 | 0.10 | 0.33 | 0.9 | Comp. ex. |

As shown in FIG. 15, in the comparison with the base member model (characteristic C2), the maximum reaction force of the characteristic C1 (first occurring peak reaction force corresponding to reaction force at stroke S0 where columnar members 100, 102 bent) was the smallest. Next, the maximum reaction force was larger in the order of the characteristics C7, C8, C9, and C10. The result was obtained that if the lengths I of the soft parts 14b, 16b are made 0.01 time to 0.15 time of the heights H of the vertical walls 14, 16, the smaller the strength ratio, the smaller the first occurring peak reaction force. Therefore, it is learned that the amount of energy absorption rises by the first peak reaction force rising the greater the strength ratio. Further, right after the initial collision occurs (stroke S1), the reaction force of the characteristic C1 became largest then the reaction force became larger in the order of the characteristics C7, C8, C9, and C10. From this, it is learned that if the strength ratio is small, the reaction force at the time of the first occurring peak falls, but the reaction force right after the initial collision occurs becomes larger and the first collision and second collision become earlier, so the amount of energy absorption rises.

Amount of Energy Absorption

Further, under the same conditions as the above, a columnar member 100 was given forced displacement and the relationship of the sizes of the soft parts 14b, 16b (lengths I, heights "h"), the strength ratio with respect to the base member, and the angles of the vertical walls 14, 16 (θ shown in FIG. 4) with the energy absorption performance of the columnar member 100 were studied by comparison with the amount of energy absorption at the base member model.

In the same way as the above, the sizes of the soft parts 14b, 16b were expressed as ratios with respect to the heights H of the vertical walls 14, 16. Variations of ratios 0.1, 0.2, 0.25, 0.33, 0.4, 0.5, 0.75, and 1.0 were prepared for the lengths I and heights "h". The variations of the angles of the vertical walls were made the five types of 50°, 60°, 70°, 80°, and 90°. Further, the variations of the strength ratios were made 0.2, 0.3, 0.4, 0.5, 0.6, 0.7, 0.8, and 0.9.

When studying the length I, the ratio of the height "h" to the height H was made 0.33, the angle of the vertical walls was made 80°, and the strength ratio was made 0.2. When studying the height "h", the ratio of the length I to the height H was made 0.1, the angle of the vertical walls was made 80°, and the strength ratio was made 0.2. When studying the angle of the vertical walls, the ratio of the length I to the height H was made 0.1, the ratio of the height "h" to the height H was made 0.33, and the strength ratio was made 0.2. When studying the strength ratio, the ratio of the length I to the height H was made 0.1, the ratio of the height "h" to the height H was made 0.33, and the angle of the vertical walls was made 80°. The levels are shown in the following Table 3.

TABLE 3

| Item of study | Size of I (—) | Size of "h" (—) | Angle of vertical walls (°) | Strength ratio (—) |
|---|---|---|---|---|
| Study of length I | 0, 0.01, 0.05, 0.1, 0.15, 0.2, 0.33, 0.4, 0.6, 0.9 | 0.33 | 80 | 0.2 |
| Study of height "h" | 0.1 | 0, 0.01, 0.05, 0.1, 0.15, 0.2, 0.33, 0.4, 0.6, 0.9 | 80 | 0.2 |
| Study of angle θ | 0.1 | 0.33 | 50, 60, 70, 80, 90 | 0.2 |
| Study of strength ratio | 0.1 | 0.33 | 80 | 0.2, 0.3, 0.4, 0.5, 0.6, 0.7, 0.8, 0.9 |

FIG. 16A to FIG. 16D show the results of the study. In FIG. 16A to FIG. 16D, the ordinates show the ratio of amount of energy absorption of the columnar member 100 being studied to the amount of energy absorption at the base member model (ratio of amount of energy absorption). If this ratio is larger than 1, the amount of energy absorption becomes larger than the base member model.

Figure 16A:
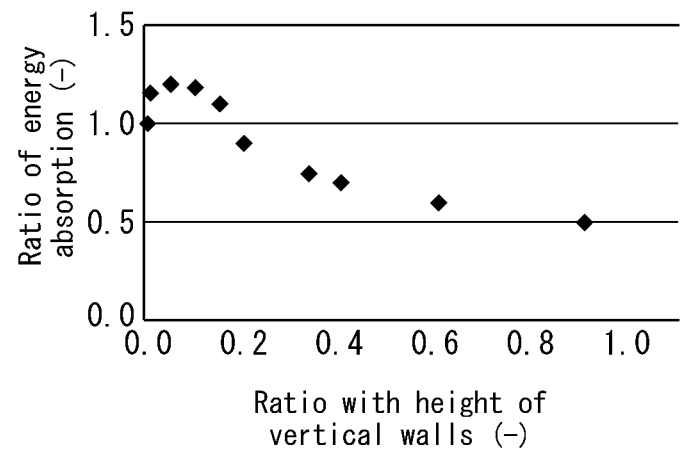
FIG. 16A is a graph showing a relationship of a length I of the soft part and a ratio of amount of energy absorption.

FIG. 16A shows the relation of the lengths I of the soft parts 14b, 16b and the ratio of amount of energy absorption. In FIG. 16A, the abscissa shows the ratio I/H of the lengths I (mm) to the heights H. As shown in FIG. 16A, if I/H is 0.01 or more and 0.15 or less, the ratio of amount of energy absorption with respect to the base member model became larger than 1. On the other hand, if I/H becomes larger than 0.15, the lengths I of the soft parts 14b, 16b in the direction of the main axis Om is not made 0.01 time to 0.15 time the heights H of the vertical walls 14, 16, so the ratio of amount of energy absorption with respect to the base member became smaller than 1. More preferably, if I/H is 0.01 or more and 0.11 or less, the ratio of amount of energy absorption with respect to the base member became remarkably larger.

Figure 16B:
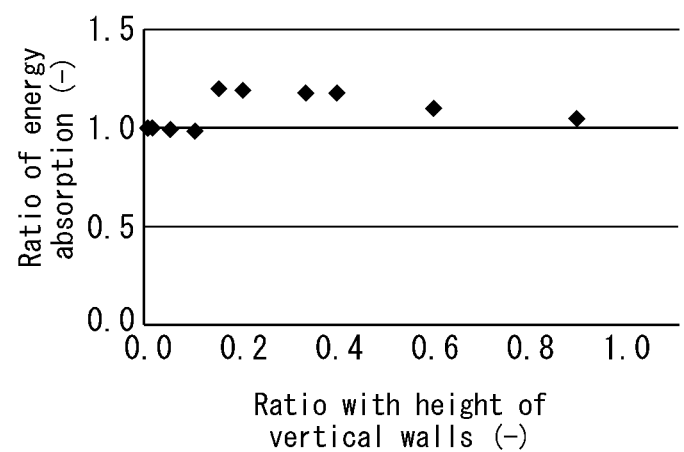
FIG. 16B is a graph showing a relationship of a height "h" of the soft part and a ratio of amount of energy absorption.

FIG. 16B shows the relationship of the heights "h" of the soft parts 14b, 16b and the ratio of amount of energy absorption. In FIG. 16A, the abscissa shows the ratio h/H of the heights "h" (mm) to the heights H. As shown in FIG. 16B, if h/H is 0.15 or more and 0.9 or less, the ratio of amount of energy absorption with respect to the base member became larger than 1. More preferably, if h/H is 0.15 or more and 0.4 or less, the ratio of amount of energy absorption with respect to the base member became remarkably larger.

Figure 16C:
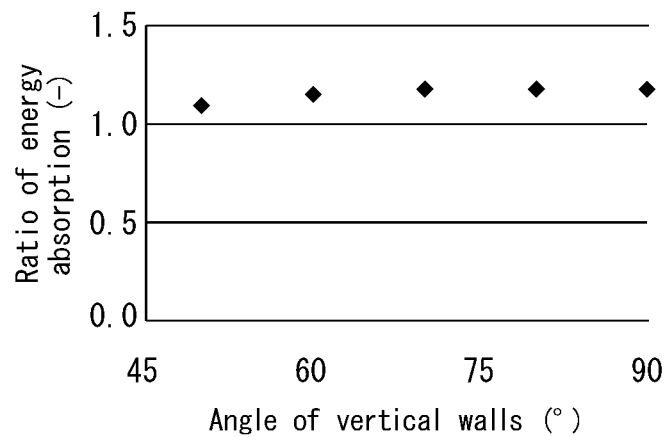
FIG. 16C is a graph showing a relationship of an angle of vertical walls and a ratio of amount of energy absorption.

FIG. 16C shows the relationship of the angle of the vertical walls and the ratio of amount of energy absorption. In FIG. 16C, the abscissa shows the angle of the vertical walls. As shown in FIG. 16C, at all of the angles of the vertical walls, the ratio of amount of energy absorption with respect to the base member model became larger than 1.

Figure 16D:
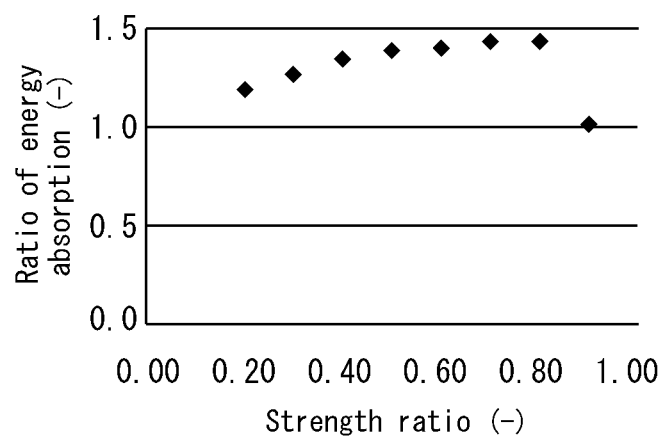
FIG. 16D is a graph showing a relationship of an angle of vertical walls and a ratio of amount of energy absorption.

FIG. 16D shows the relationship of the strength ratio and the ratio of amount of energy absorption. In FIG. 16D, the abscissa shows the strength ratio. As shown in FIG. 16D, if the strength ratio was 0.9, no first collision occurs, so as a result no improvement in the amount of energy absorption could be found, but if the strength ratio was 0.2 or more and 0.8 or less, the ratio of amount of energy absorption with respect to the base member model was larger than 1. More preferably, if the strength ratio was 0.3 or more and 0.7 or less, the ratio of amount of energy absorption with respect to the base member became remarkably larger.

Note that, in FIG. 16A and FIG. 16B, the data of the ratio of amount of energy absorption in the case of a ratio of the abscissa (I/H, h/H) of 0.0 show the results at the base member model where no soft parts 14b, 16b are provided.

Distance From Ridge Parts to Top Ends of Bead Parts

If the columnar member 100 is subjected to a compressive load in the direction of the main axis Om, a relatively large reaction force is generated at the ridge parts 15. For this reason, if the soft parts 14b, 16b enter into the ridge parts 15, the reaction force generated at the ridge parts 15 ends up being reduced and the impact energy absorption ability of the columnar member 100 falls. For this reason, preferably the positions of the top ends of the soft parts 14b, 16b become lower than the ridge parts 15.

More preferably, the positions of the top ends of the soft parts 14b, 16b match the positions of the bottom ends of the ridge parts 15 at the distance of h1 from the top plate 12. According to this constitution, if the columnar member 100 is subjected to a compressive load, at the ridge parts 15, a large reaction force is generated and the facing inside walls 13f at the back side of the projecting part 13c can be made to collide with each other earlier.

On the other hand, even when the positions of the top ends of the soft parts 14b, 16b are lower than the positions of the bottom ends of the ridge parts 15, it is possible to increase the reaction force with respect to the base member model.

Figure 17:
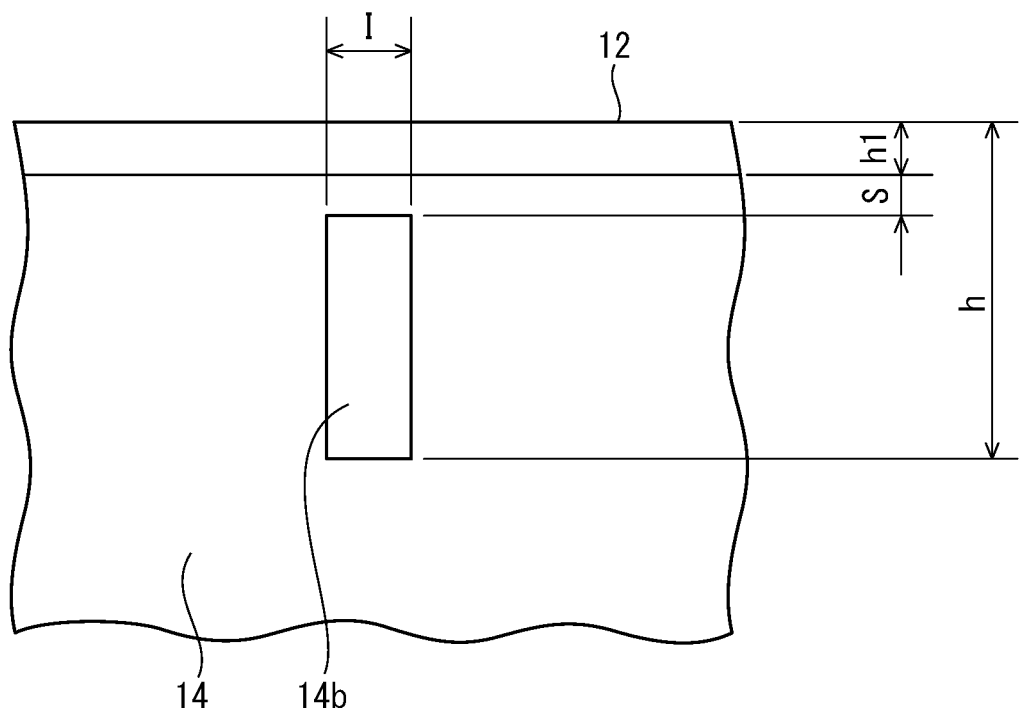
FIG. 17, in the same way as FIG. 12, is a schematic view showing in detail a soft part provided at a vertical wall and a view showing an example where a space is provided between a position of a top end of a soft part and a position of a bottom end of a ridge part.

FIG. 17 is a schematic view showing in detail a soft part 14b provided at a vertical wall 14 in the same way as FIG. 12 and shows the example where a space "s" is provided between the positions of the top ends of the soft parts 14b, 16b and the positions of the bottom ends of the ridge parts 15.

Figure 18:
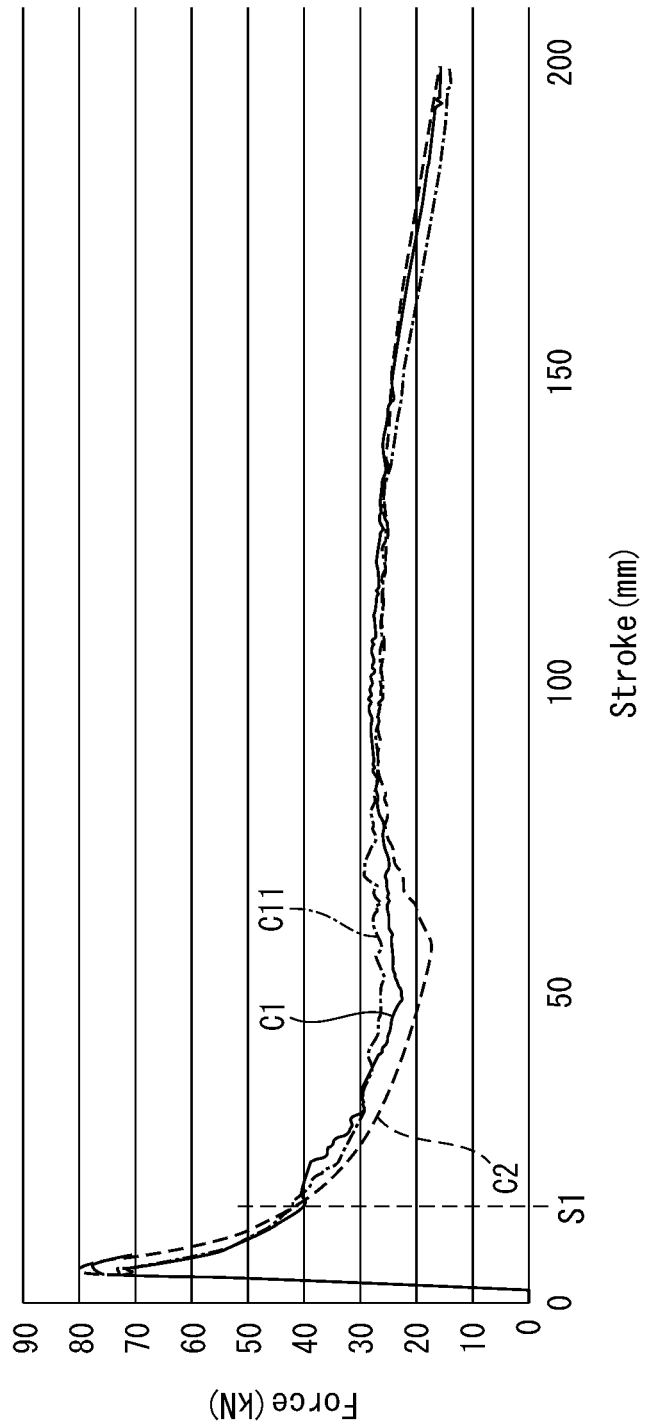
FIG. 18, like FIG. 14, is a graph showing a relationship between a stroke and reaction force of a columnar member and a graph showing a characteristic C11 at the columnar member when making the space "s" shown in FIG. 17 5 mm together with a characteristic C1 and a characteristic C2 of FIG. 14.

FIG. 18, in the same way as FIG. 9, is a graph showing relationships between the stroke and the reaction force of the columnar members 100, 102 and shows the characteristic C11 at the columnar member 100 when making the space "s" shown in FIG. 17 5 mm together with the characteristic C1 and the characteristic C2 of FIG. 9. The I/H of the columnar member 100 when making the space "s" 5 mm, the lengths of the soft parts 14b, 16b of the vertical walls 14, 16 in the height H direction, the strength ratio, and the angle of the vertical walls were made the same as the columnar member 100 giving the characteristic C1.

As shown in FIG. 18, in the characteristic C11 of the columnar member 100 providing a space of 5 mm between the positions of the top ends of the soft parts 14b, 16b and the positions of the bottom ends of the ridge parts 15, compared with the characteristic C1, the reaction force right after the stroke S1 where the initial collision occurs falls, but the reaction force becomes much higher than the characteristic C2 of the base member model. Therefore, as shown in FIG. 17, it is also possible to provide the space "s" between the positions of the top ends of the soft parts 14b, 16b and the positions of the bottom ends of the ridge parts 15. In this case, the positions of the top ends of the soft parts 14b, 16b and the positions of the bottom ends of the ridge parts 15 need not necessarily be made to match, so the freedom of design of the soft parts 14b, 16b becomes greater and a reduction in the production costs can be expected.

REFERENCE SIGNS LIST 10, 50. hat shape members
12, 56. top plates 12a, 12b. side edges
13a, 13d. recesses
13b, 13e, 13f. inside walls
13c. projecting part
14. vertical wall
14a, 16a. edge parts
14b, 16b. soft parts
15. ridge part
16. vertical wall
18, 20, 52, 54. flange parts
22. bend inducing part
30. plate-shaped member
40. tool
42. hole
100, 102, 104. columnar members
110. car body floor

The invention claimed is:

1. A columnar member having at least
a top plate and
two walls extending vertically and connected to the top plate at ridge parts at both side edges of the top plate and extending along the ridge parts,
which columnar member
having a bend inducing part at least at a part of the top plate and
each of the two walls having a soft part at a position adjoining the ridge part and corresponding to the bend inducing part in a direction of extension of the columnar member,
the bend inducing part being a part with a strength lower than a part adjoining the bend inducing part at the top plate,
each of the soft parts having yield strength lower than a part adjoining each of the soft parts at the wall, each of maximum lengths of each of the soft parts in the direction of extension of the columnar member being 0.01 time to 0.15 time a height of the wall having each of the soft parts.

2. The columnar member according to claim 1, where each of the lengths of each of the soft parts in the height direction of the wall is 0.15 time to 0.9 time the height of the wall having each of the soft parts.

3. The columnar member according to claim 1, where each of ratios of each of yield strengths of each of the soft parts with each of yield strengths of each of parts adjoining each of the soft parts at the walls is 0.2 to 0.8.

4. The columnar member according to claim 1, wherein end parts of the soft parts at the top plate sides are positioned at end parts of the ridge parts connecting the top plate and the walls at the wall sides.

5. The columnar member according to claim 1, wherein the bend inducing part is comprised of a recessed part, hole edge part, or projecting part provided at the top plate.

6. The columnar member according to claim 1, wherein
the top plate has at least two reinforcing parts provided separated from each other in the direction of extension of the columnar member, and
the bend inducing part is positioned between the reinforcing parts separated from each other in the direction of extension of the columnar member.

7. The columnar member according to claim 1, wherein the bend inducing part includes a recessed part, hole edge part, or projecting part provided at the ridge part connecting the top plate and the wall.

8. The columnar member according to claim 1, forming a front side member or rear side member of a vehicle.

* * * * *